United States Patent [19]

Kuehl

[11] Patent Number: 5,428,692

[45] Date of Patent: Jun. 27, 1995

[54] CHARACTER RECOGNITION SYSTEM

[76] Inventor: Eberhard Kuehl, Stolzing St., No. 8, 8000 Munich 81, Germany

[21] Appl. No.: 791,074

[22] Filed: Nov. 18, 1991

[51] Int. Cl.$^6$ .......................... G06K 9/46; G06K 9/48
[52] U.S. Cl. ........................... 382/204; 382/199
[58] Field of Search .................... 382/10, 21, 22, 23, 382/25, 26, 30, 55

[56] References Cited

U.S. PATENT DOCUMENTS

| | | | |
|---|---|---|---|
| 3,999,161 | 12/1976 | Van Bilzem | 382/25 |
| 4,193,056 | 3/1980 | Morita | 382/20 |
| 4,415,880 | 11/1983 | Scott | 382/27 |
| 4,561,106 | 10/1985 | Yoshida | 382/25 |
| 4,628,532 | 12/1986 | Stone | 382/21 |
| 4,777,651 | 10/1988 | McCann | 382/56 |
| 4,837,842 | 6/1989 | Holt | 382/26 |
| 4,903,312 | 2/1990 | Sato | 382/21 |
| 4,921,107 | 5/1990 | Hofer | 209/546 |
| 4,941,195 | 7/1990 | Tanaka | 382/61 |
| 4,959,870 | 9/1990 | Tachikawa | 382/56 |
| 4,982,342 | 1/1991 | Moribe | 382/21 |
| 5,058,182 | 10/1991 | Kuan et al. | 382/25 |
| 5,105,470 | 4/1992 | Will | 382/21 |
| 5,164,996 | 11/1992 | Pastor | 382/25 |

OTHER PUBLICATIONS

Xie et al., "On Machine Recognition of Handprinted Chinese Characters by Feature Relaxation", Pattern Recognition, vol. 21, No. 1, pp. 1-7 (Mar. 1987).
Nagao, "Control Strategies in Pattern Analysis", Pattern Recognition vol. 17, No. 1, pp. 45-56 (1984).
Lam et al., "Structural Classification and Relaxation Matching ... ", Pattern Recognition, vol. 21, No. 1, pp. 19-31 (1988).
Arakawa, "On–Line Recognition of Handwritten Characters–Alphanumerics, Hiragana, Katakano, Kanjii", Pattern Rec., vol. 16, No. 1, pp. 9-16 (1983).
Wolberg, Proc. IEEE Conf. on Comp. Vision & Pat. Recog., Jun. 1986, pp. 168-172.

*Primary Examiner*—David K. Moore
*Assistant Examiner*—Michael Cammarata
*Attorney, Agent, or Firm*—M. Lukacher

[57] ABSTRACT

An optical character recognition system which automatically reads handwritten characters and the like which do not have to be printed in a special format. Recognition tables derived from the pattern bit map and from a skeleton pixel matrix describe the character in terms of the relative position of the pixels along the borders of the character and provide a plurality of recognition strings, one in each table, for the front and rear views of the character and for the shape of the holes in the character which are opened from the top (as in the numeral four) or opened from the bottom (as in the numeral seven). From the recognition tables, the characters are recognized by searching recognition files containing blocks of successions of lines of code corresponding selectively to the codes in the recognition tables. The recognition file is arranged in hierarchal order so that the blocks in the file which represent characters having the lowest level of recognition difficulty in the character set to be recognized are searched first, the next highest level next and so forth. Recognition blocks for the next character in the group of blocks for the same difficulty of recognition level or to blocks for the next level of recognition difficulty. In this manner characters are recognized with a high degree of reliability and an indication of failure to recognize the character occurs rather than misrecognition.

53 Claims, 27 Drawing Sheets

X  Connection to the LEFT

Y  Connection to the RIGHT

M  STRAIGHT DOWN Connection

VU  Connection

VA  Connection

S  Element

L  Element

O  Hole

EE  No Pixels (Empty)

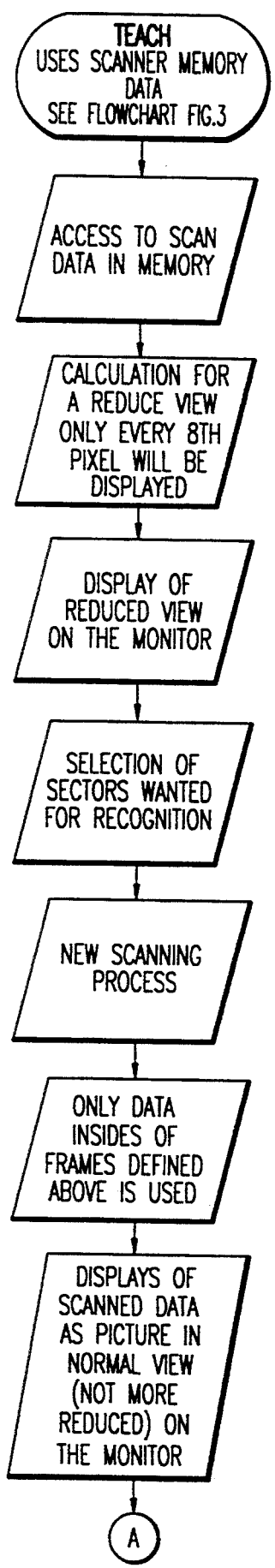
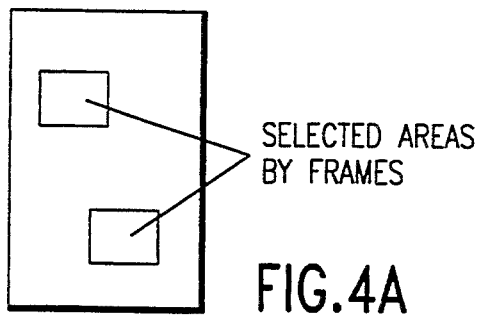
SELECTED AREAS BY FRAMES
FIG.4A
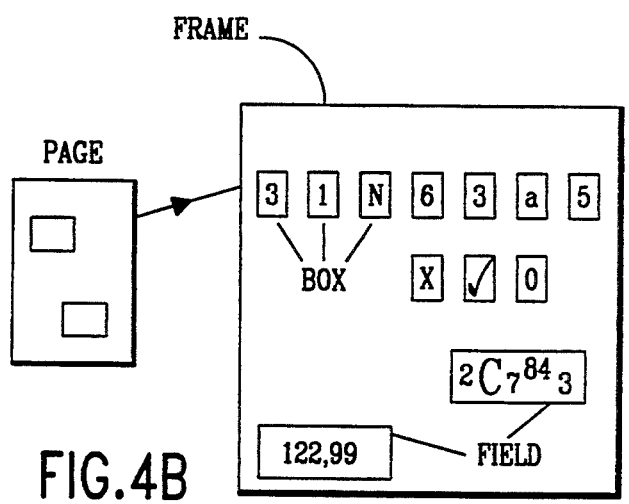
FIG.4B
FIG.4

CHARACTER RECOGNITION SYSTEM

Reference is made to a microfiche appendix of 3 microfiche containing 139 frames.

DESCRIPTION

The present invention relates to a character recognition system (method and apparatus), and particularly to an optical character recognition system which is capable of automatic recognition of characters in a character set, which characters may be handwritten without restriction as to their shape or format.

This invention is related to and provides improvements in my invention which is described in U.S. patent application Ser. No. 07/626,517 filed Dec. 12, 1990 and entitled Character Recognition System, now U.S. Pat. No. 5,307,424, issued Apr. 26, 1994.

The invention is especially suitable for the recognition of handwritten characters, such as letters of the alphabet and numerals. The invention is, however, generally applicable for the recognition of symbols, and the term character, as used herein, includes other configurations or symbols which represent or communicate information by way of observable patterns.

Accurate and reliable character recognition requires that misrecognition of a character, erroneously as another character in the set to be avoided. It has been found that such false recognition is more disadvantageous than taking a character to be unrecognizable. While it is important in order to provide a system of character recognition which is commercially practicable to have the capability of recognizing 80 to 90 percent of characters in the character set, it is more desirable to maintain the rate of false recognitions below one percent.

From time to time patents have issued which relate to optical character recognition of handwritten characters (see U.S. Pat. Nos. 4,006,998; 4,628,532, and 4,837,842). At the present time, however, commercially practical handwritten character recognition systems of the type described in the foregoing patents or in accordance with any other known technologies have not been available.

The problem of accuracy and reliability of recognition is exascerbated by the vast varieties in which patterns representing characters in even a limited character set, such as arabic numerals, can be written. Accordingly presently known technology, which for the most part requires an immense memory of data and super high computational speeds, has been unable to bring automatic recognition of handwritten characters to the point of practical application.

The above referenced patent application provides advances in the technology which are needed and useful in automatic recognition of handwritten characters and like and enables the reduction of memory capacity and computational speed (the need for super computers and have enormous memory capacity) to be capable of recognizing handwritten characters which may be written with a large number of variations on a page (e.g., a business form), whether individually or in words or in multidigit numbers, with a high probability of recognition. The system of the above referenced application as well as this application is also capable of being operated with relatively low cost optical scanners, for example which have a resolution of 200 dots or pixels per inch. It is the principal feature of the present invention to enhance the recognition capability of the system described in the above referenced application in terms of the numbers of variations of the pattern in which the characters to be recognized are written and also in terms of reducing misrecognition of characters. It is a further feature of this invention to provide an improved character recognition system which can handle the recognition of handwritten or hand printed characters through the use of a computer of reasonable size and memory capacity, such as are commercially available at reasonable cost, such as a personal computer having a 32 bit (386-type chip) microprocessor. In accordance with this feature of the invention super or ultra fast computers and memories having the capacity to store sufficient data to provide matching patterns for the thousands of variations in which characters in a set can be written are not required. In summary, it is the object of the present invention to provide an improved character recognition system which advances the art of character recognition to the point where a commercially practicable system for automatically recognizing characters which can be handwritten in various shapes or formats may be achieved.

Briefly described, the system provided by the invention is operative upon a digitized pattern or bit map of individual characters which appear on a page which is read, as by an optical scanner, into computer memory. This bit map is translated or encoded into a plurality of recognition tables each describing the character in a different way. Each of these ways depends upon the relationship of the data representing pixels in a matrix of rows and columns (x-y coordinates) in which the pixels (data representing each pixel) are located in the bit map. These tables are obtained from the bit map and from a skeleton of pixel representing data which follows the center line of the character pattern of the bit map and may be obtained by a thinning computation as described hereinafter and also in the above reference U.S. patent application. One of these tables, which is preferably derived from the skeleton pixel matrix, is obtained by encoding the matrix into another matrix represented by connection codes indicative of the relationship of pixels in each row to pixels in adjacent rows. These connection codes are reduced, so as to encompass a plurality of character shapes, into further codes so as to define a string of digital signals which constitutes one of the recognition tables. The other recognition tables encode the relationship of pixels in successive rows along the borders of bit map and pixel map into strings of digital signals. These tables are utilized selectively in order to recognize characters in the set. Recognition proceeds by searching a recognition file containing blocks of successions of digital signals. These blocks are preferably arranged in hierarchal order with groups of blocks representing characters of the lowest level of recognition difficulty next and so forth. Each block contains instructions as to which table or which bit map to search for data in lines of the table (which correspond to rows in the bit map or pixel skeleton map) to search for a match with the block. Preferably the file for each character of each level of recognition difficult is proceeded by a block which, if matched, excludes that character. Then the searching of the file can proceed directly to the next character in that level or to characters of the next more difficult level of recognition difficulty. Once a character is recognized it is stored and the program proceeds to the next character on the page. If the character is unrecognizable, information to that effect is stored in the data file and the program proceeds to the next character on the page. Accordingly all of the characters on the page are processed for recognition. The system provides recognition with a high level of acccuracy and reliability, both recognized and unrecognizable characters being determined by the system.

The foregoing and other object features and advantages of the invention as well as a presently preferred embodiment thereof and the best mode now known for practicing the invention will become more apparent from a reading of the following description in connection with accompanying in which:

FIG. 1 (consisting of FIGS. 1A, B and C) is a block diagram and flowchart showing an embodiment of the system in accordance with the present invention and the programming of the computer in which the system is implemented, on an overall basis;

FIGS. 4 and 4C is another flowchart which shows the teach program which defines the fields or zones where the characters are placed in computer memory;

FIG. 4A is a diagramatic view of a page or paper sheet showing selected areas wherein characters are located by frames;

FIG. 4B shows an expanded view of the zones (boxes or fields) in a frame;

FIG. 6A is a more detailed version of the flowchart shown in FIG. 6;

Figures 6, 9:
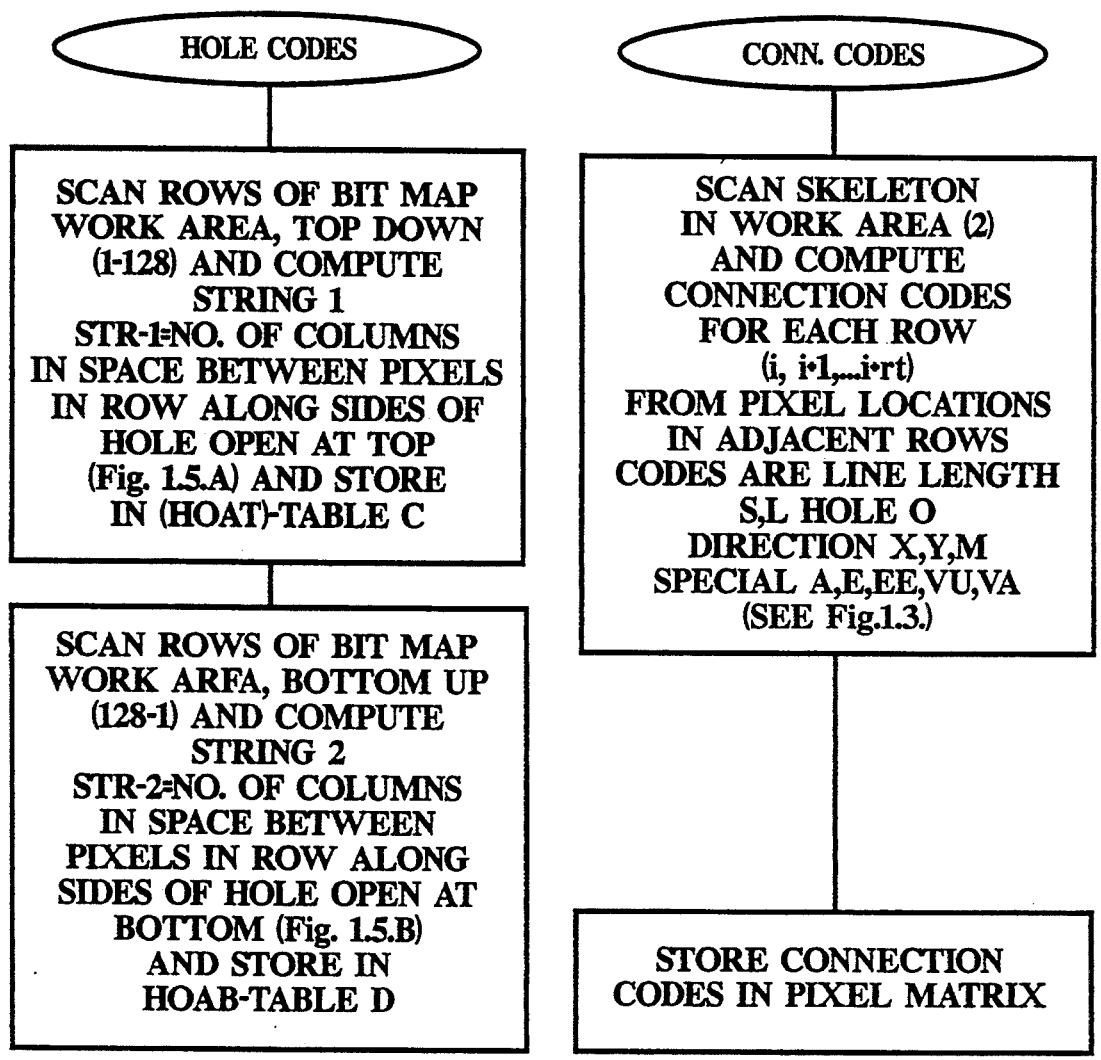
FIG. 6 is a flowchart showing generally the routine for obtaining the connection codes.
Figure 6:
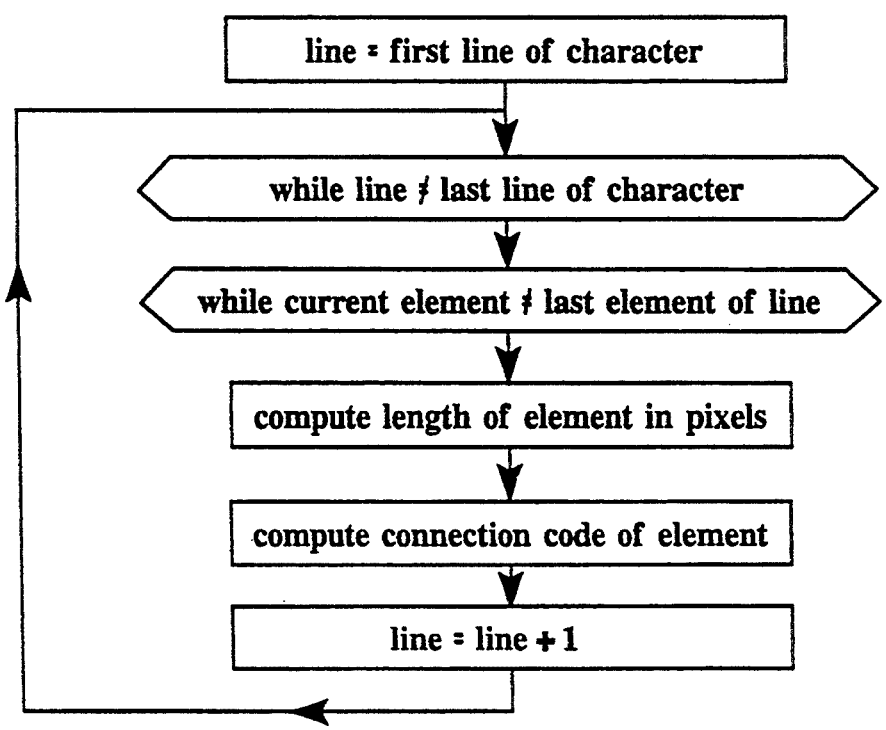
Figure 7:
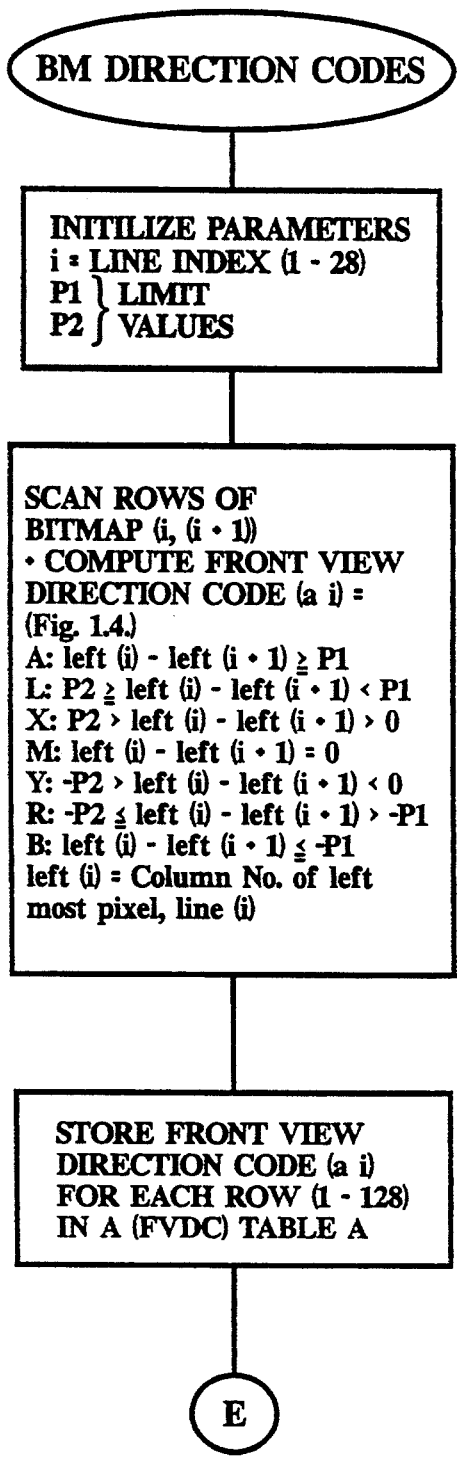
Figure 7:
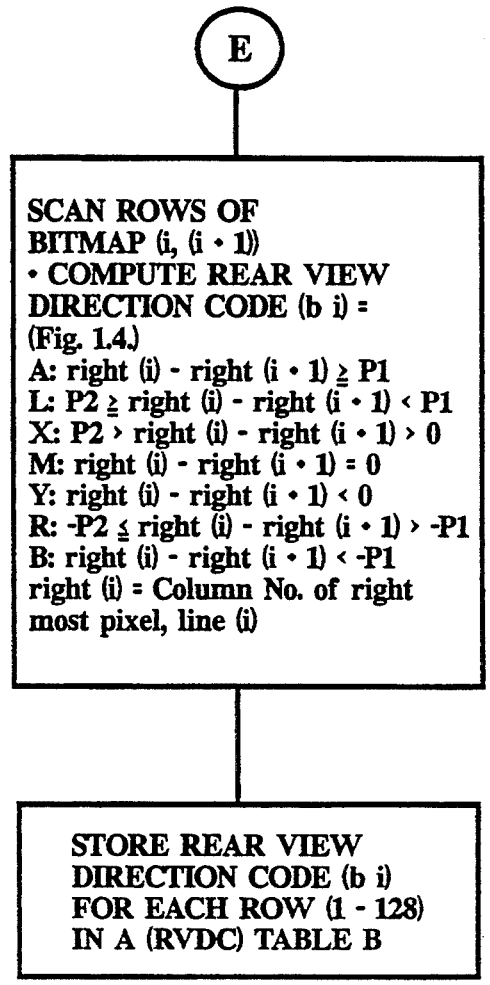
Figure 8:
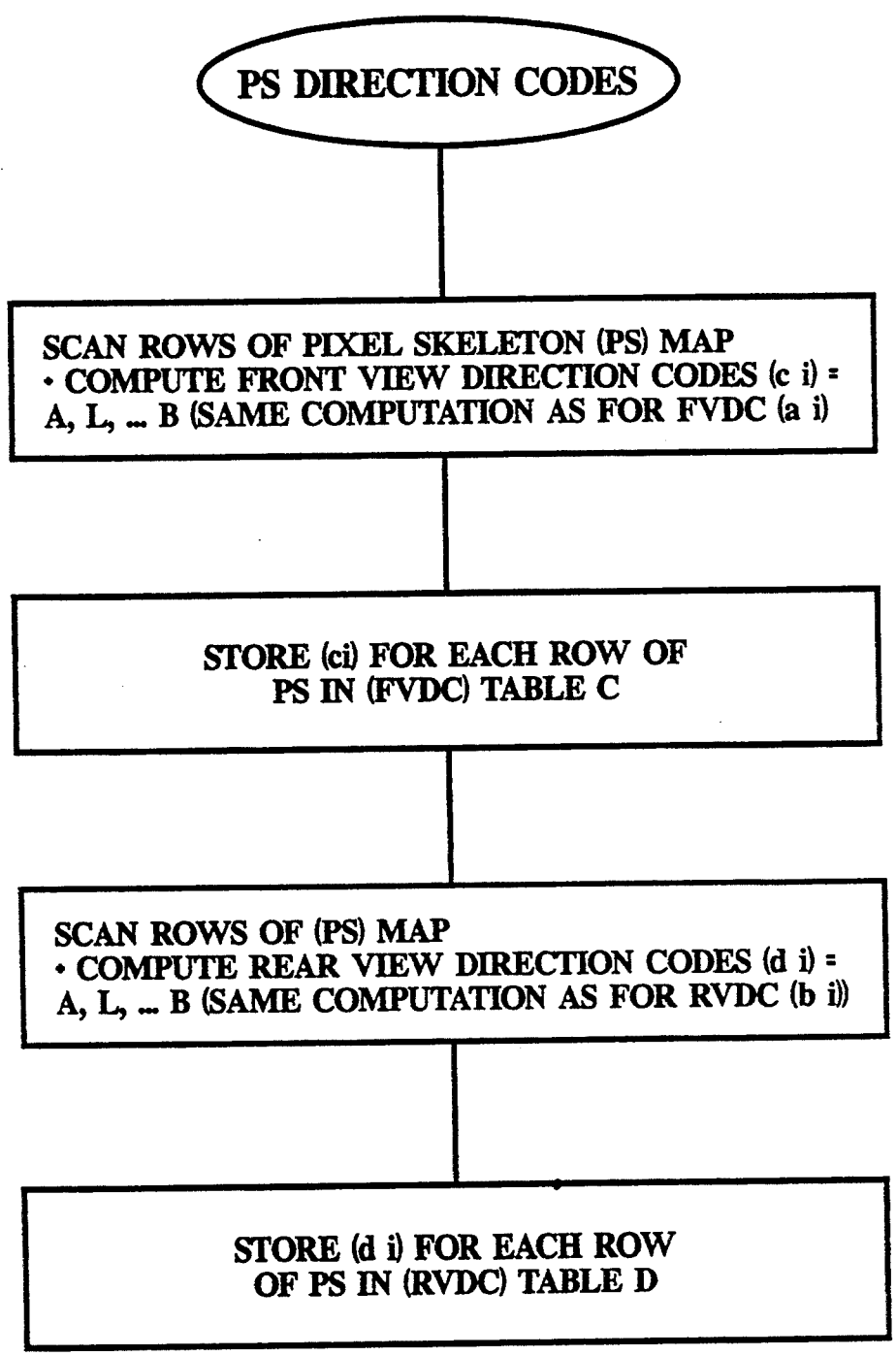

FIG. 7A and B is a flowchart showing the routine for obtaining the direction codes constituting the data strings in the recognition tables defining the borders of the bit map;

FIG. 8 is a flowchart of the program for obtaining the direction codes defining the borders (front and rear views) of the pixel skeleton matrix;

FIG. 9 is a flowchart of the program for obtaining hole codes.

Figures 1A, 1B:
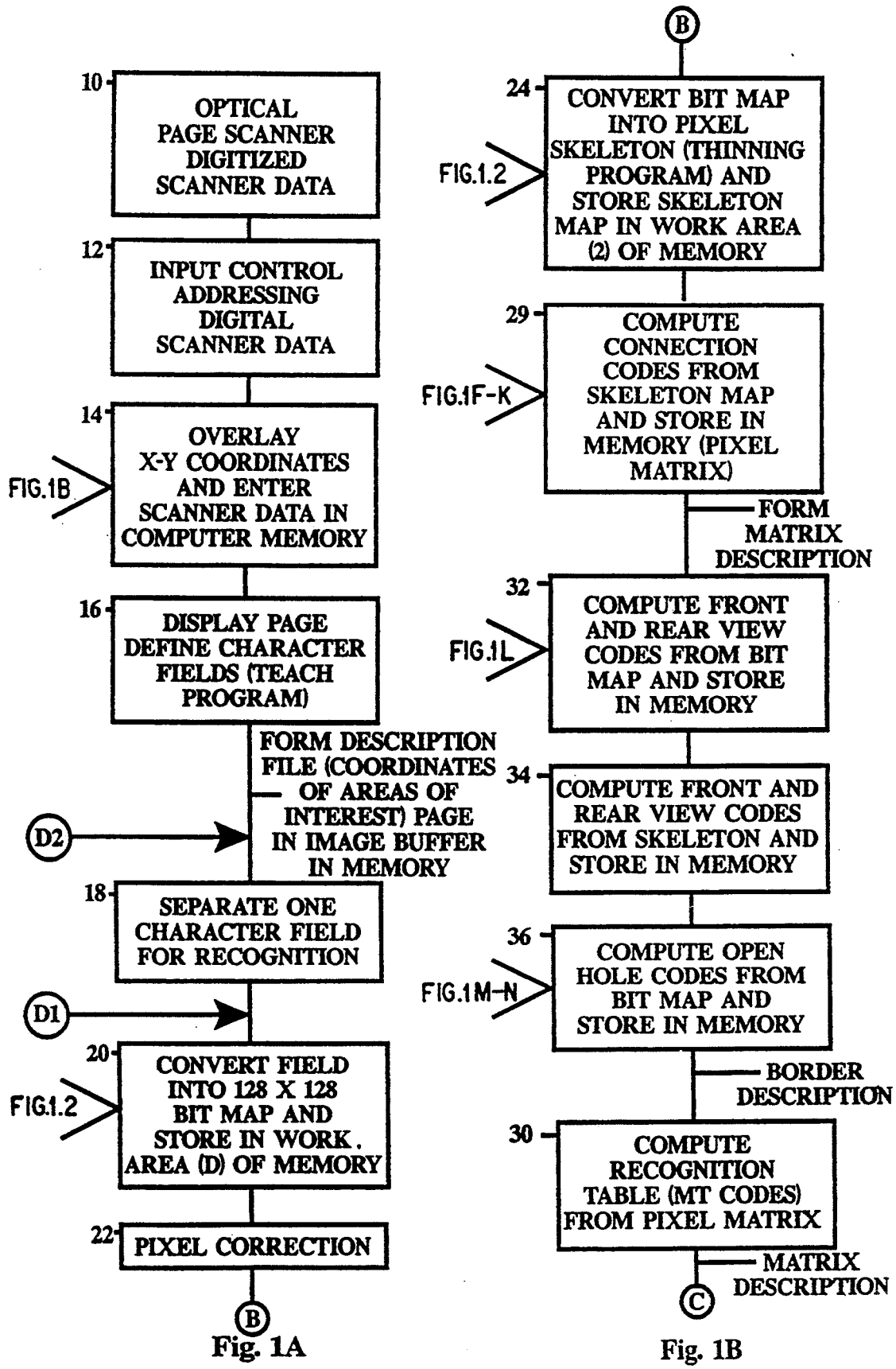
FIG. 1D is an exemplary field of numerals in an exemplary character set which is subject to recognition by the system shown in FIG. 1.
FIG. 1E are diagrams showing exemplary bit maps, for the numeral 2 and for the skeleton of numeral 2 after pixel correction.
FIG. 1F are diagrams of pixels in rows and adjacent rows which may be found in the skeleton matrix and connection codes corresponding thereto.
FIG. 1G are exemplary diagrams of pixel skeleton matrixes for the numerals 2 and 8 showing some of the connection codes which are derived from the relative position of pixels in rows and adjacent rows of the skeleton matrix.
FIG. 1H is a pixel skeleton matrix for a pattern of the numeral 2 showing connection codes and combinations of connection codes for each row thereof.
FIG. 1I is a diagram similar to FIG. 1H showing connection codes obtained from the pixel skeleton matrix of a pattern representing the numeral 5.
FIG. 1J is a view similar to FIGS. 1H and B of a pixel skeleton matrix representing the numeral four and the connection codes for each row thereof.
FIG. 1K is a diagram similar to FIGS. 1H, B and C showing the pixel matrix skeleton for an exemplary numeral three and the connection codes for each row thereof.
FIG. 1L is a view of the bit map for an exemplary numeral four indicating the codes representing the borders on the left and right side thereof (front and rear views)
FIGS. 1M and 1N are respectively bit maps of exemplary numerals 4 and 7 showing codes representing an upper border and a lower border to the extent of holes therein which are open from the top and the bottom of the bit map, respectively.
Figure 10:
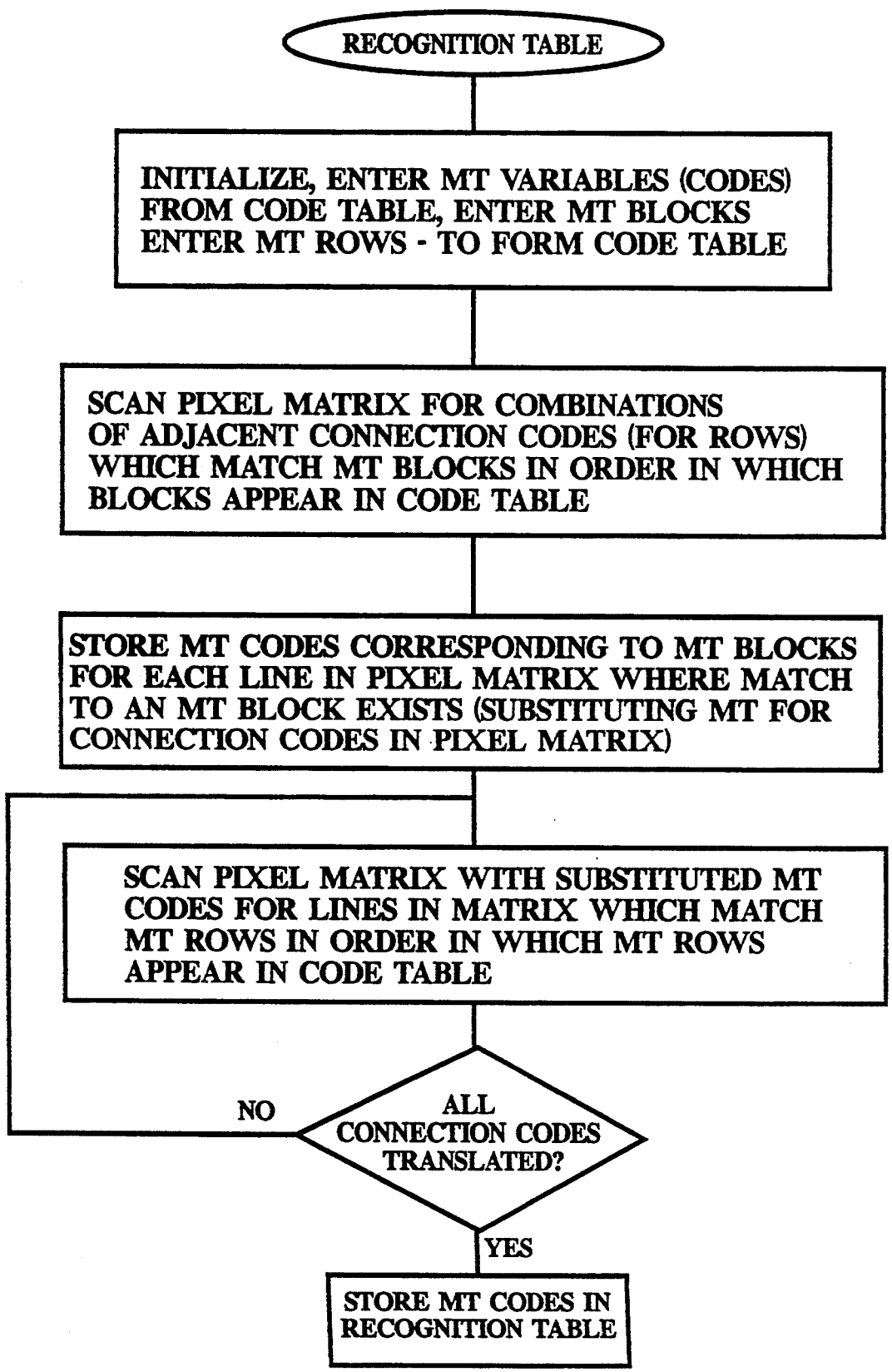
Figure 11:
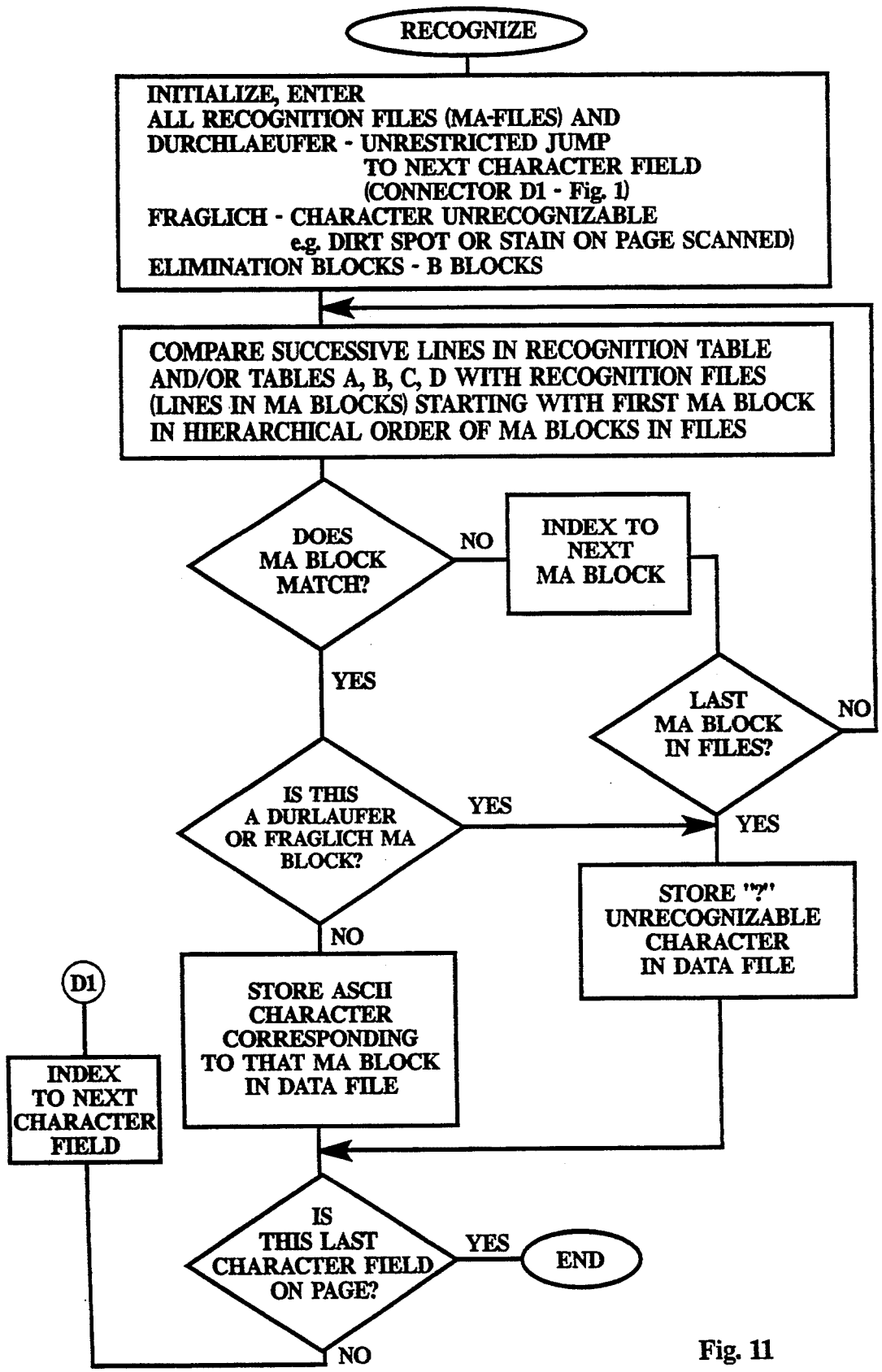
Figure 11A:
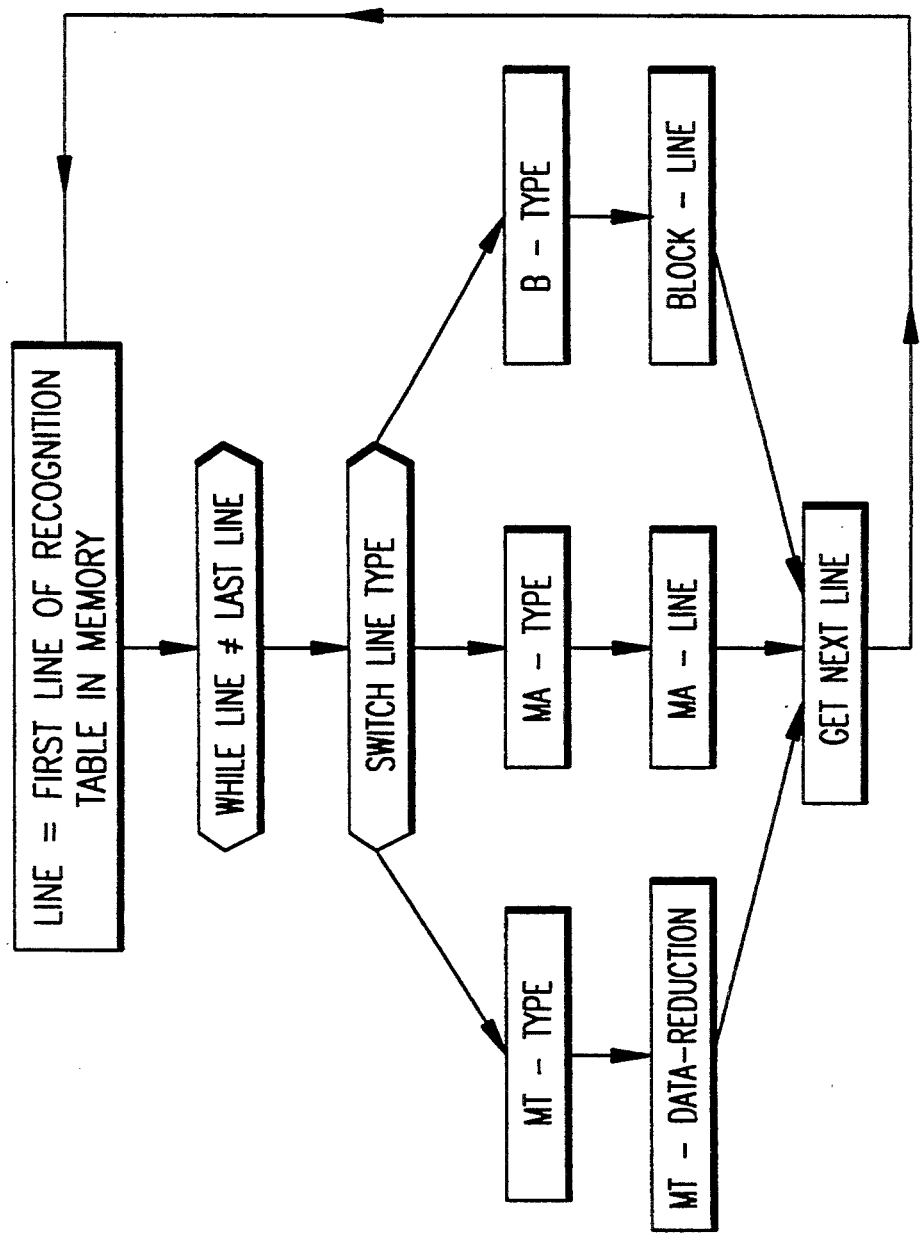
Figure 12:
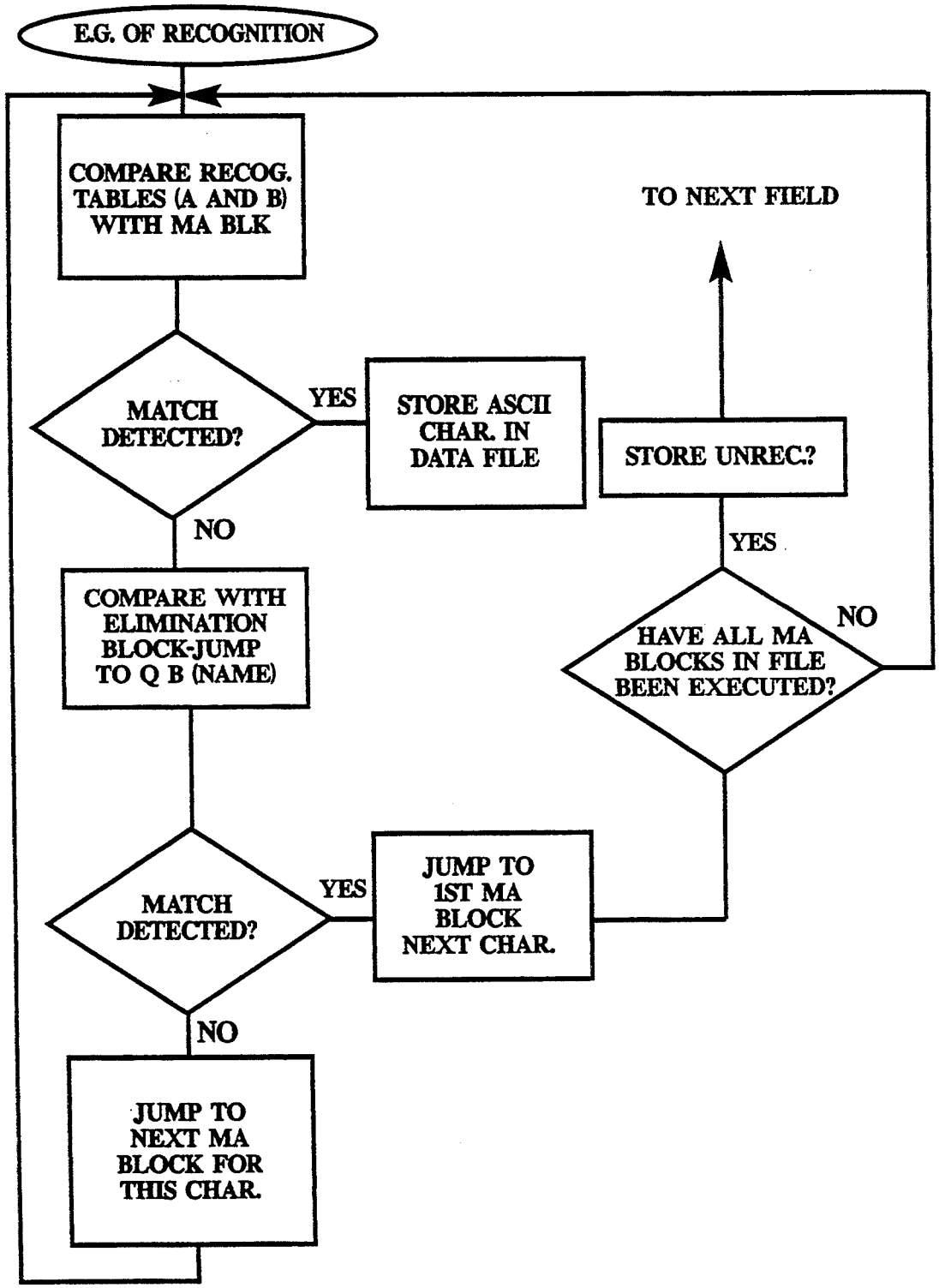
Figure 12:
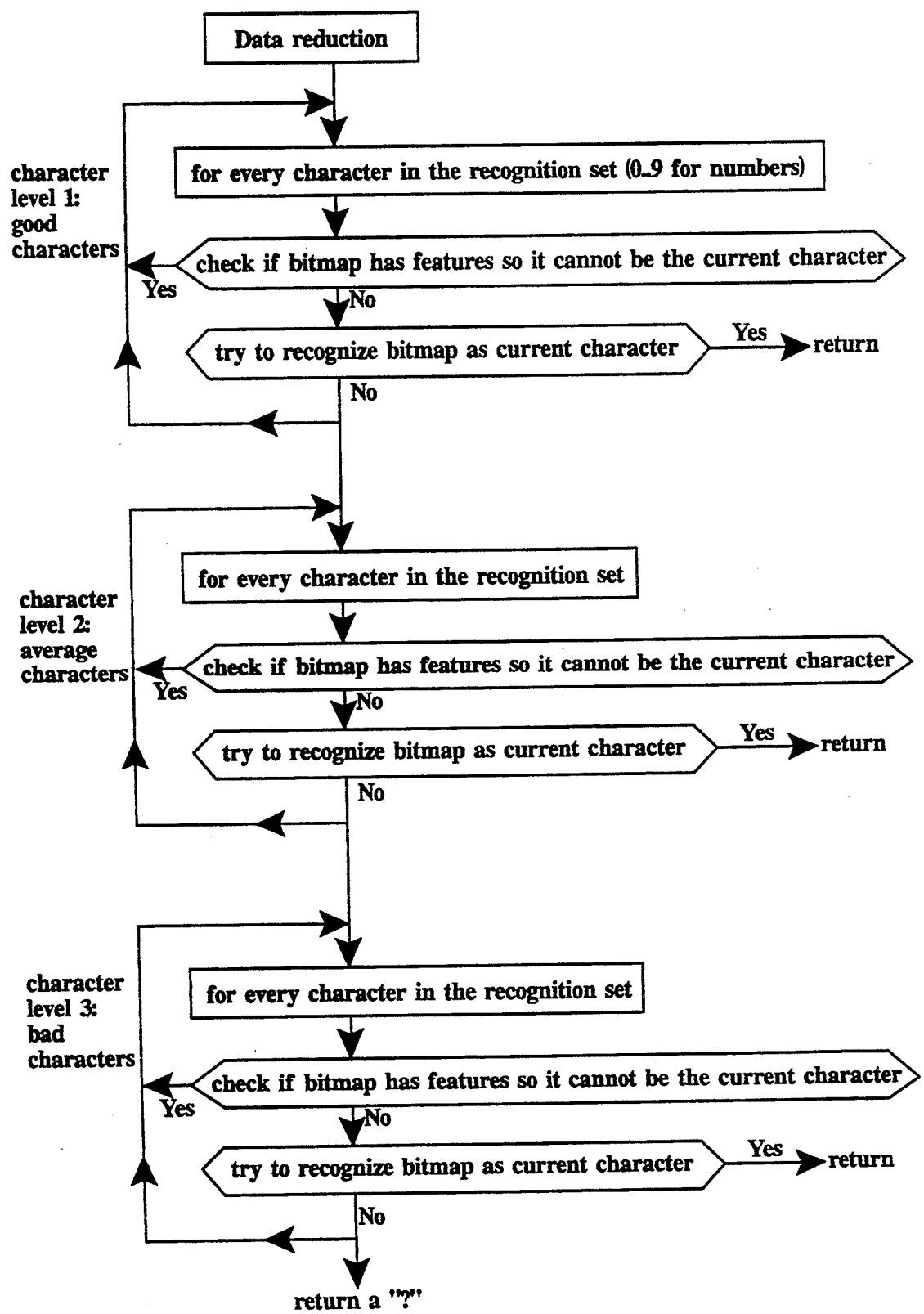
Figure 13:
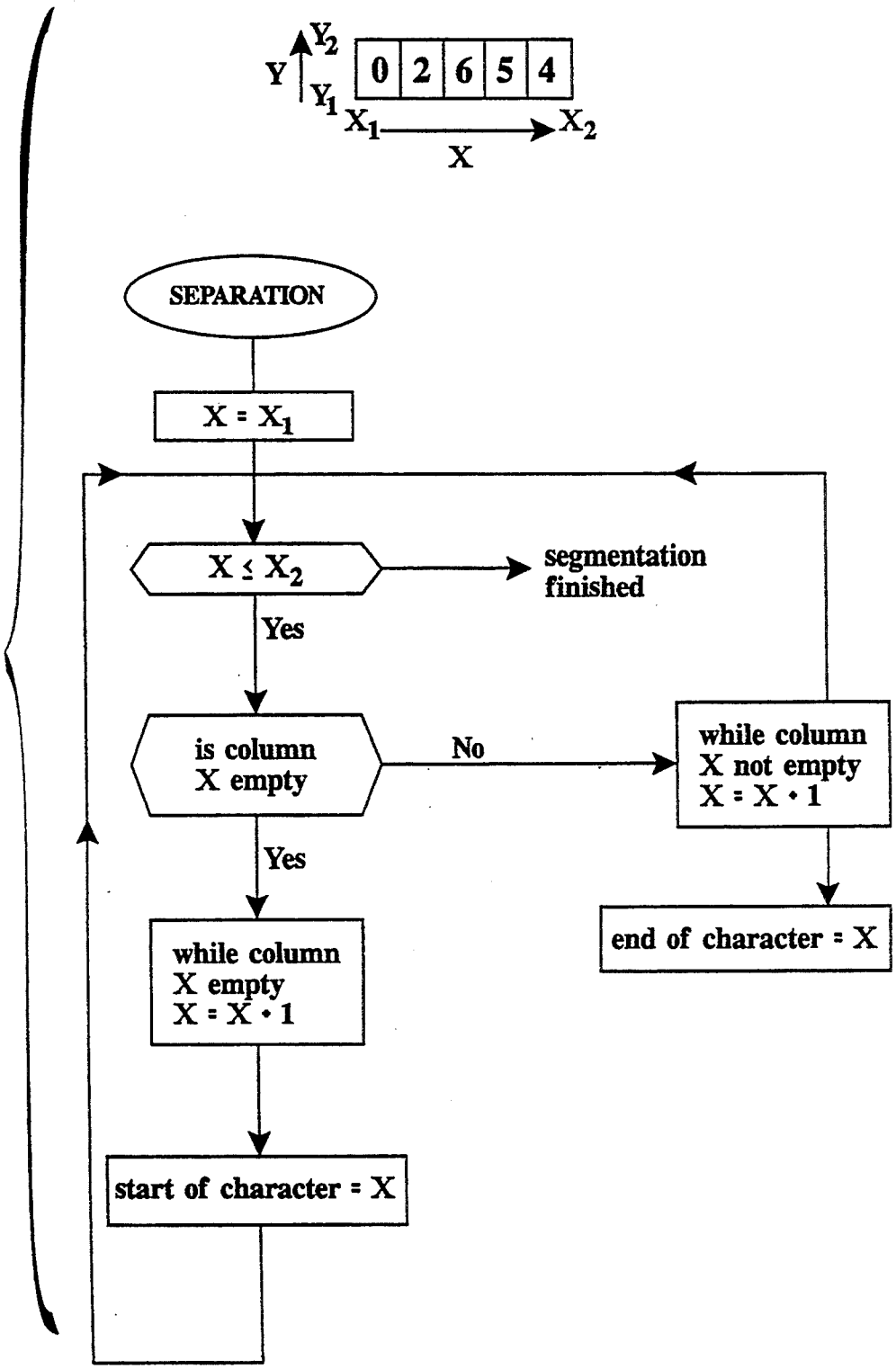

FIG. 10 is a flowchart of the program for developing the recognition table from the connection codes in the pixel matrix which the connection codes constitute;

FIG. 11 is a flowchart showing the recognized routine wherein recognition files are searched for matches with data from the recognition tables;

FIG. 11A is another flowchart showing a version of the recognition routine which illustrates the processes for data reduction of the connection codes and for searching through tables of data reduction (MT blocks) and rows and through blocks (MA blocks) and B blocks in the recognition file;

FIG. 12 is a flowchart illustrating the execution of the recognition routine in recognizing a typical character;

FIG. 12A is another flowchart showing the arrangement of the recognition file in a hierarchy in accordance with the level of difficulty of recognition, lowest level of recognition difficulty first, in a general way; and FIG. 13 is a flowchart showing the program for the separation of character fields for recognition, which is an operation illustrated in FIG. 1A.

As shown in FIG. 1, the scanning of a page is carried out by an optical page scanner 10, which may be a low cost scanner having a resolution of 200 dots (pixels) per inch. The scanner provides digitized scanner data where each row is one pixel high and the length of the row is equal to the width of the scanned paper page. This data is inputted via the computer into computer memory. The computer may, for example, be a desktop terminal or personal computer which is capable of handling 32 bit, words, or bytes. The program proceeds through the input control and addressing of the digital scanner data and the control of the memory addresses which in effect overlays a coordinate system of rows and columns ("x") in the row direction and ("y") in the column direction) in the computer memory. As explained more fully below, characters are assigned fields on the page and data (e.g., in the scanner output) from the rest of the page is not used. The program proceeds through these operations of input control 12 and overlying coordinates 14. These operations will be more apparent from FIGS. 2 and 3.

Figure 2:
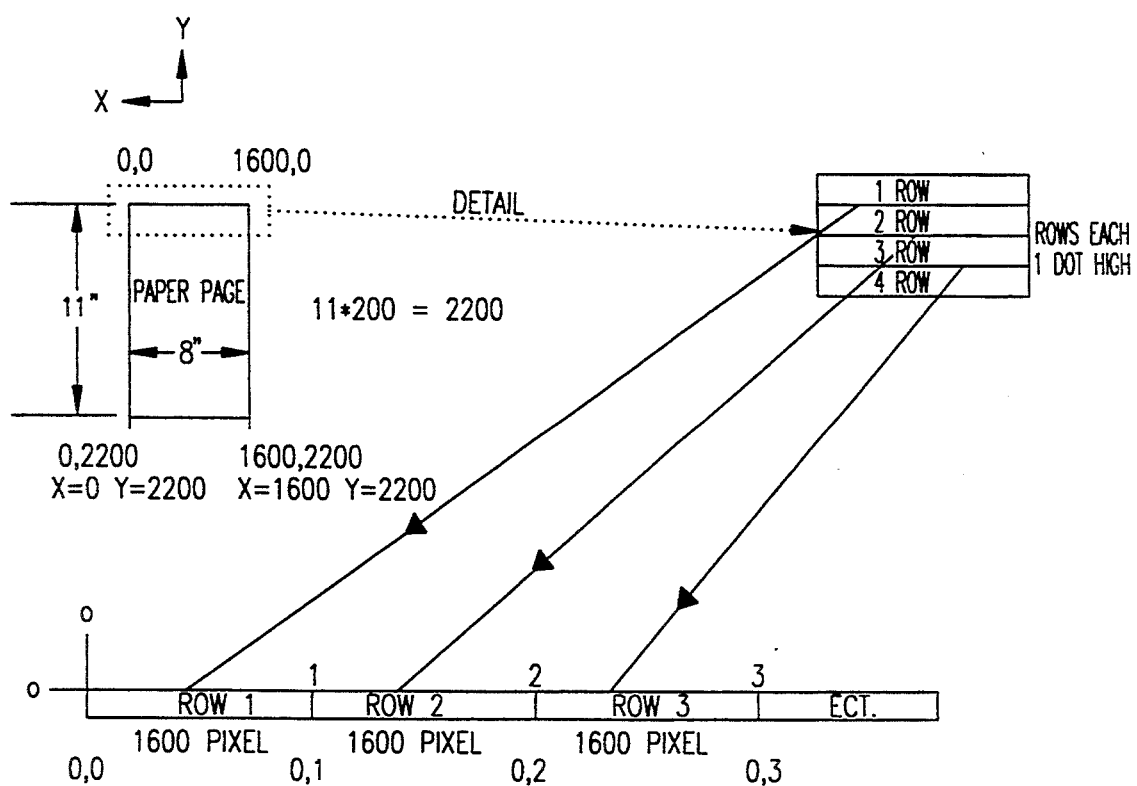
FIG. 2 is a diagram schematically showing the scanning of a page on which characters to be recognized are written and showing the organization and allotment of computer memory space.

The data input from the scanner may be a multibit byte or may be thresholded so that the intensity of any dot is marked as set for a black point and nonset for a white point of intensity less than the threshold level. A typical page is shown in FIG. 2 as being 8" wide. Considering the resolution of the scanner is 200 dots (pixels) per inch, each row contains 8 times 200 or 1600 pixels. Since one 8 bit byte of memory can carry 8 pixels, one scanned row requires only 1600 divided by 8 or 200 bytes of RAM. The digitized, scanned data is organized in the memory by locating the scanned rows one after another in memory. For a typical character, 1 mm in height and with the 200 dots per inch resolution, 8 rows of pixels are needed. Therefore, if a character is, for example, 4 mm high it needs 4×8 or 32 rows to be stored in memory. A page 11" in length contains 11×200 or 2200 rows in the y direction, and if 8" wide contains 8×200 or 1600 pixels per row in the x direction. The total capacity to store an 8×11 sheet is then approximately 440 Kb of memory space. Such memory space is well within the capacity of RAM devices or hard disk memories which are commercially available at low cost. Such memories have additional space for work areas where bit maps representing the data can be stored. It is desired to store data in bytes rather than thresholded bits since the computers' operating systems are designed to work on a byte-by-byte basis. Thus, the working areas desirably consist of byte locations. In the herein illustrated system, there is provided a working area for a character bit map which defines a matrix of 128 rows in the x direction and 128 columns which extend in the y direction. One of these working areas stores the bit map defining the shape of the pattern forming the character as it is handwritten on the page which is scanned by the scanner. The other working area is another matrix of 128 rows (in the x direction) and 128 columns (in the y direction).

The characters to be identified are segregated into zones or fields through the use of the teach program, guided if desired by a display of the overall page bit map on a monitor as shown at 16. The characters are then separated out of their frames individually and one at a time for recognition as shown at 18. Fields may also be defined each for different kind of characters, e.g., "handprinted numbers", "handprinted capital letters", "printed number", "printed capital letters", "printed small letters", "handprinted small letters" or "script" . . . starting from the first character . . . of each field and then field by field in a predefined sequence, e.g., from the field nearest the upper left corner of the page to the field nearest the lower right hand corner of the page.

Figure 5:
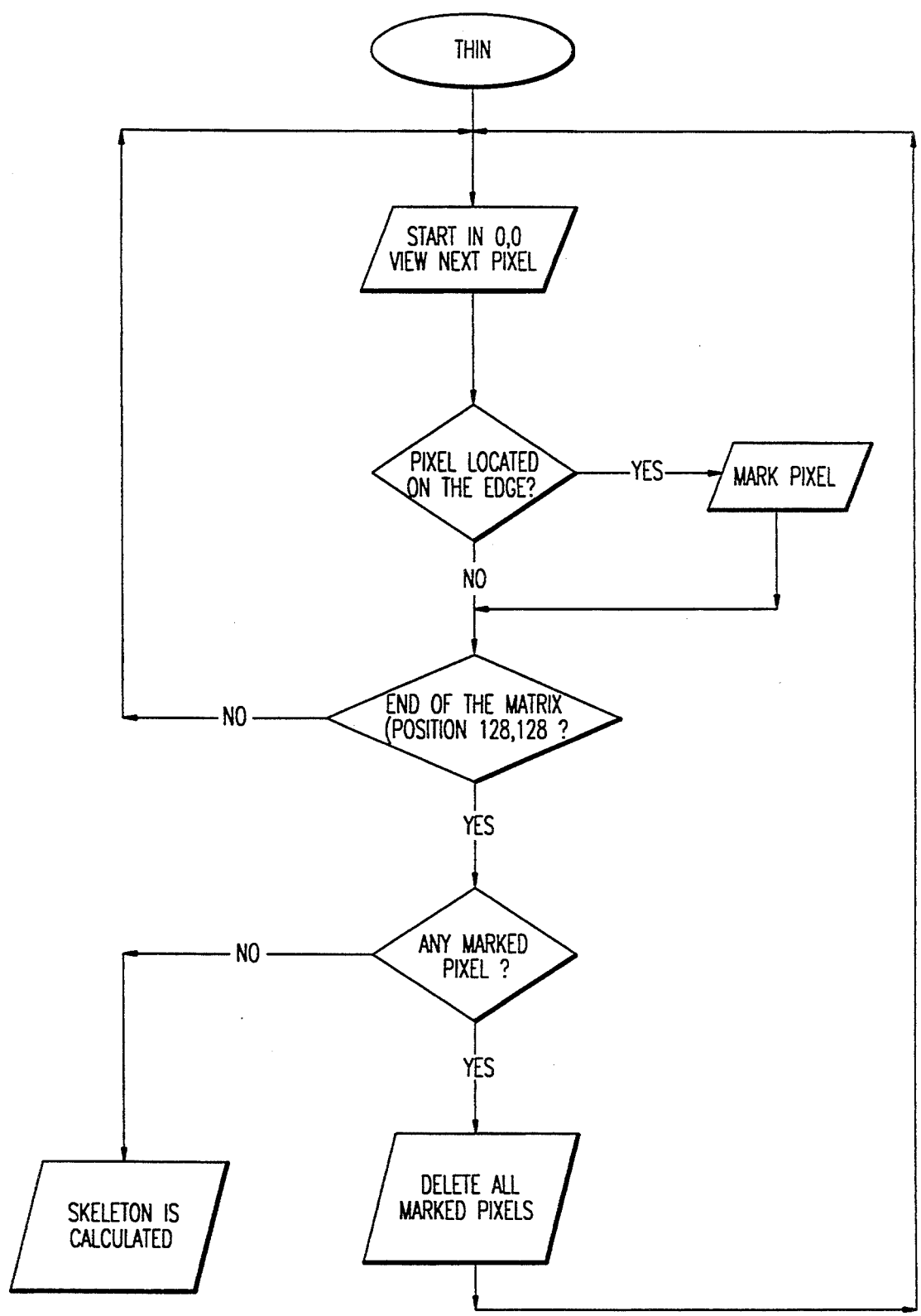
FIG. 5 is a flowchart which illustrates the program for thinning the bit map (the pixel pattern of a character in an exmplary 128 by 128 matrix in rectangular coordinates wherein the direction of movement in the matrix is from the upper left corner to the lower right corner, the thinning process providing a skeleton following the center line of the pattern of pixels in the bit map.

The character field which is selected for recognition is converted into the 128×128 byte bit map. The term bit map is used because the bytes which represent the dots (pixels) may be 8 bits all set or ones. The bytes representing the absence of pixels in the matrix are all clear, i.e. are zeros. Thus, the bytes in effect constitute a bit map. This bit map is stored in one work area of memory as shown at 20. After pixel correction 22, which aligns the pixels in the map which extend along rows at the top and bottom and in the middle of the map, the map is converted into a pixel skeleton map 24 by the thinning program (FIG. 5). The pixel skeleton map is also a 128×128 byte matrix. It is stored in the second work area (2) of the memory.)

Figure 3:
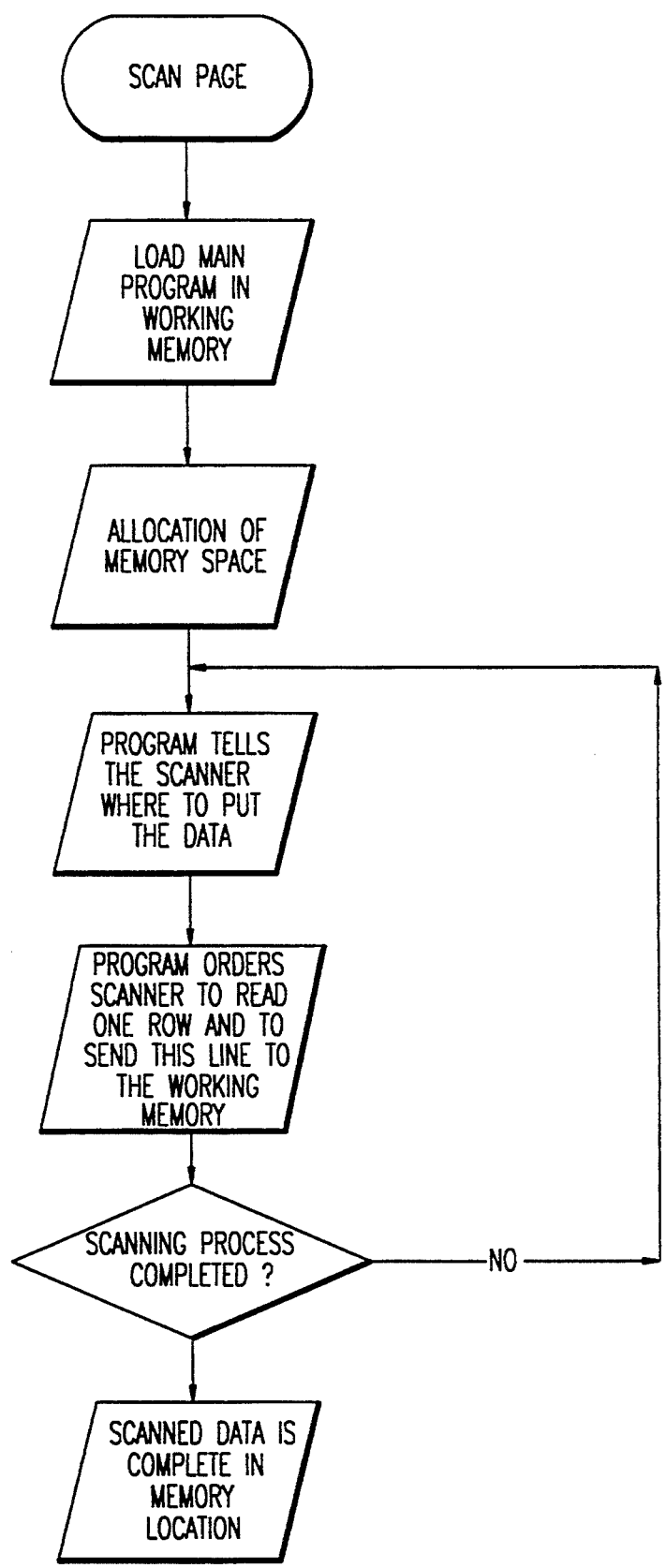
FIG. 3 is a flowchart of the scan page routine of the program for inputting the scanning data into the computer memory (input control on addressing as shown in FIG. 1A)

The scanning program is stored with the other programs which carry out the operations shown in the flowcharts in the working memory of the computer (in RAM). As shown in FIG. 3, the operating system of the computer provides the start address where data is stored. Then the digitized data is transferred from the scanner. The transfer occurs one row at a time until all of the data is stored. For example, if the start address for the first row is 1,000, then the next row will start at the start address plus the length of one line of bytes of 1,000 plus 200 which equals 1,200. Because the length of each line is known, the digitized pattern is effectively drawn in an x, y coordinate system. This coordinate system in the above example has its base point at memory address 1,000 where the pixel data for the upper left-hand corner of the page may be found. Generally, the addresses of a pixel in the memory is equal to the start address plus the number of the column, multiplied by the length of the row, plus the number of the row divided by 8. The position of the pixel in the 8 bit byte (the bit position) equals the row number in octal or modulus 8 code.

Figure 1C:
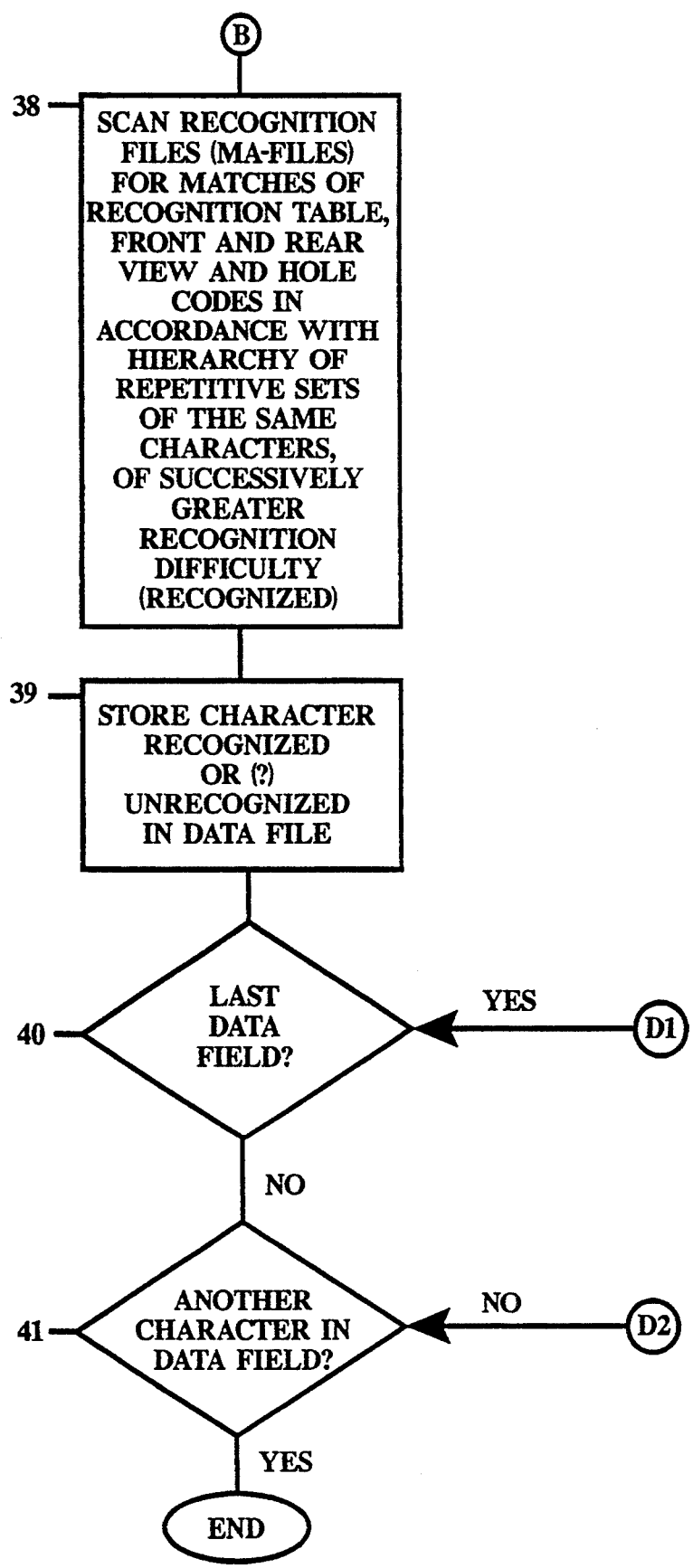
Figure 1D:
Figure 1E:

The segregation of the zones or fields will become more apparent from FIG. 1D. A frame consisting of a string of numerals is shown enlarged in FIG. 1D. The program separates such a frame from other fields on the page and then proceeds to separate individual characters into character fields. These character fields are shown enclosed by boxes 26 and 28 in FIG. 1D. A bit map for an exemplary character, the numeral 2, which is provided by the conversion of the field into the 128×128 bit map matrix is shown in FIG. 1D. The skeleton matrix for the same character as shown in FIG. 1D is depicted in FIG. 1D. The bit map has undergone pixel correction of its bottom row before the conversion into the pixel skeleton shown in FIG. 1D. This conversion effectively smooths the bottom and top of straight lines. The base of the pixel pattern for the 2 in FIG. 1D has a misaligned partial row of pixels on the top thereof and two misaligned rows of pixels on the bottom thereof. The pixel correction operation searches the pattern for such misalignments and smooths them. When the pixel skeleton is calculated, it follows the center line of the pattern. Therefore, the base of the numeral (2) in the pixel skeleton is formed as a straight line of pixels.

Figure 4C:
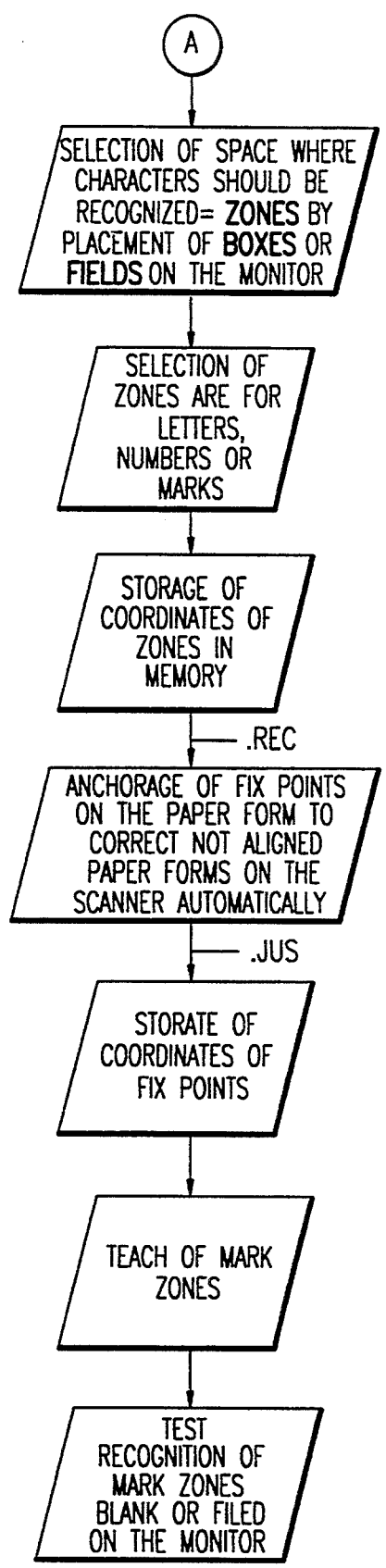

Next, consider the teach program as shown in FIG. 4. This program provides information as to where on the page the characters are written. The teach program marks the areas where the frames and zones (boxes or fields) containing the characters to be recognized are located. FIGS. 4A and 4B illustrate the frames, zones, and boxes or fields. There is a character field or box and more than one character is in a frame or zone as designated in FIG. 4B. FIG. 4B shows one of the frames on the page shown in FIG. 4B.

The teach program uses the digitized page in memory. The page is displayed in reduced form on a monitor. The reduced form contains only every 8th pixel; thus, only every 8th pixel is displayed. In this reduced form, the operator can define the zones by interactively putting frames around the parts containing characters utilizing a graphics program, forming a cursor on the monitor, to define the coordinates of the frames. The coordinates are stored in a file with the extension (name) "AUS". This file consists of coordinates for the upper left-hand corner and the lower right-hand corner of each frame. In the file, the coordinates can be separated by semicolons. The file, therefore, has the coordinates of the x upper left corner; y upper left corner, x lower right corner, and y lower right corner. An example of the AUS file is the addresses 524; 638; 1200; 920. Another AUS file safe for the second frame may be 767; 170; 845; 250.

After the AUS file is developed, another scan of the page is completed. Now the display on the monitor shows the defined areas and fields (zones) can be interactively placed around the areas in which the characters are located. For example, the adjacent numerals 1–0 shown in FIG. 1D constitute the zone where the file starts from the upper left of the numeral 1 on the first line and ends at the lower right at the numeral 0. The zoned marking step is used to mark and define the zones in memory. Every frame may be more specifically defined by the type of entry into the file. Possible types are: (1) for a marked area; (2) for numbers; (3) for letters; (4) for a group of numbers; and (5) for a group of letters. If the field type is a marked field, the program for recognition is somewhat different than for other characters. The number of pixels in the field is counted and compared with information about the zones which is stored in the file which is called by the name "rec".

Each line of the rec file has the following structure: "x" upper left; "y" upper left; "x" lower right; "y" lower right; average pixel count (only for marked fields); maximum pixel count (only for marked fields); teach count (how often has the field gone through the teach program); text string (for later diagnostic purposes); and field type. By how often the field is taught is meant, how many times it is scanned in the operation of the scanner. It may be desirable to scan each zone 10 or 15 times and get the average count of the area of maximum pixels which can be contained in a zone. An example of an rec file is as follows:

1783; 243; 1833; 276; −1; −1; 10,000; 0; 525; 1;
1783; 202; 1831; 236; −1; −1; 10,000; 0; 526; 1;
1783; 164; 1832; 197; −1; −1; 10,000; 0; 527; 1;
1783; 123; 1834; 160; −1; −1; 10,000; 0; 528; 1;

If the field is a number field, that information is designated in the rec file by the −1; −1; which in this example are initialized values for the average values of the pixel count since this example is for number fields (FIG. 1D). 10,000 is the initialized value for the peak pixel count. The numbers referred to the coordinate system which is designated the addresses in memory from the rec file; i.e., the part of the page (image) to be recognized as being designated. Marked types (periods or other punctuation) can be recognized merely by a compare of the pixel counts for the fields with designated pixel counts; fewest for a period, slightly more for a comma, etc. Other marked fields are not considered in this example. Another feature of the teach program is to define fixed points (anchors) on the page which may not always be in the same position due to skew in the scanner. To correct displacement due to skew, the program calculates the distance from an anchor point to a fixed point on the paper. This distance is stored in the file with the name "jus". Corrections from the jus file may be used to correct each character field before separation of the individual character fields one at a time for recognition as shown at 18 in FIG. 1A.

The routine for separation or segmentation of a zone into character fields is illustrated in FIG. 13. For an exemplary zone of numerals, zero, 2, 6, 5, and 4. The coordinate system in memory is indicated by coordinates x(1), y(1) and x(2), y(2). The program searches for empty spaces between characters starting from the left and going right (i.e., from x(1) to x(2) in this example. When x=x(2), segmentation or separation of all the characters in the zone into their respective fields in the x and y directions has been completed and the x and y coordinates of the corners of each field are stored in the separated character file. The addresses in the file identify the characters on the page, starting from zones in the upper left-hand corner of the page to the end of the zone in the lower right-hand corner of the page. After each character is recognized, the program indexes to the next character at the next address in the file until all of the characters are recognized sequentially and individually. The program shown in FIG. 13 illustrates how the x coordinates are obtained. The y coordinates of the character fields are obtained similarly. The program continues until x=x(2) and the end of the zone is reached. Prior to the end of the zone, the start of a field is indicated by an empty column in the computer memory space in which the page is stored. By empty is meant that no pixels are set in the y direction as the memory is scanned in the x direction (along the rows). The number of the first column which is not empty is the address of the start of the character. Similarly, the number of the column succeeding columns which are not empty is the address in the x direction of the end of a character field. The separation program effectively embraces the characters by boxes such as shown at 26 and 28 in FIG. 1D.

The thin or thinning program as shown in FIG. 5 is also described in the above-referenced U.S. Patent application. The thinning process calculates the center line of the pixel pattern and is one pixel thick. The program follows the algorithm reported in the text authored by T. Pavlidis and entitled, "Algorithms for Graphics and Image Processing", published by Computer Science Press, Rockville, Md., U.S.A., 1982. The German edition was published by Heinz Heise GmbH of Hanover, Germany, and the Algorithm is in Section 9.2 of that text.

Returning to FIG. 1 and particularly FIG. 1B, the recognition operations are conducted utilizing the bit map matrix in work area (1) and the skeleton matrix in work area (2). The purpose of the recognition operations is to find characters in the ASCII alphabet of characters, numerals and other symbols which correspond to the patterns in the bit map images in these work areas. As a result of the recognition, a data file is obtained which defines the characters on the page starting from the upper left-hand corner, proceeding down the page line-by-line until the lower right-hand corner is reached. However, the sequence can be otherwise. For example, numeric field can be processed first, then letter fields, etc. These characters are then available together with their addresses on the page for automatic processing of the forms or documents which have been automatically read; thereby, avoiding the need for manual entry (keypunching) of the characters on the form. The recognition operations are discussed herein, particularly with reference to the recognition of a character set consisting of Arabic numerals, specifically the numerals 1–0. It will be appreciated that other characters such as alphabetic characters and special symbols may be recognized irrespective of the patterns in which they are handwritten or otherwise entered on the page.

The recognition process effectively starts by the computation of connection codes from the skeleton map which is stored in work area (2) in the memory to form a description of the memory space in terms of the pixels stored therein. The connection codes are then stored in an array which is referred to as the pixel matrix. The computation proceeds by scanning the skeleton row by row, starting from the top row of the 128 rows in the work area and ending on the bottom or 128th row. The connection codes are selected from prescribed codes which represent a combination of the length and number of columns over which the skeleton extends in a row and the connection of the pixels in that row (whether one or more) to the pixels in the adjacent rows, both above and below the row being scanned. The connection codes indicate either line length, hole length (the length in number of columns in a row which do not contain pixels), and directions. There are also special codes indicating the start and end of the line. These codes are represented by single or multiletter symbols and are shown in FIG. 6.

Figure 1F:
Figure 1F:
Figure 1F:
Figure 1F:
Figure 1F:
Figure 1F:
Figure 1F:
Figure 1F:
Figure 1G:
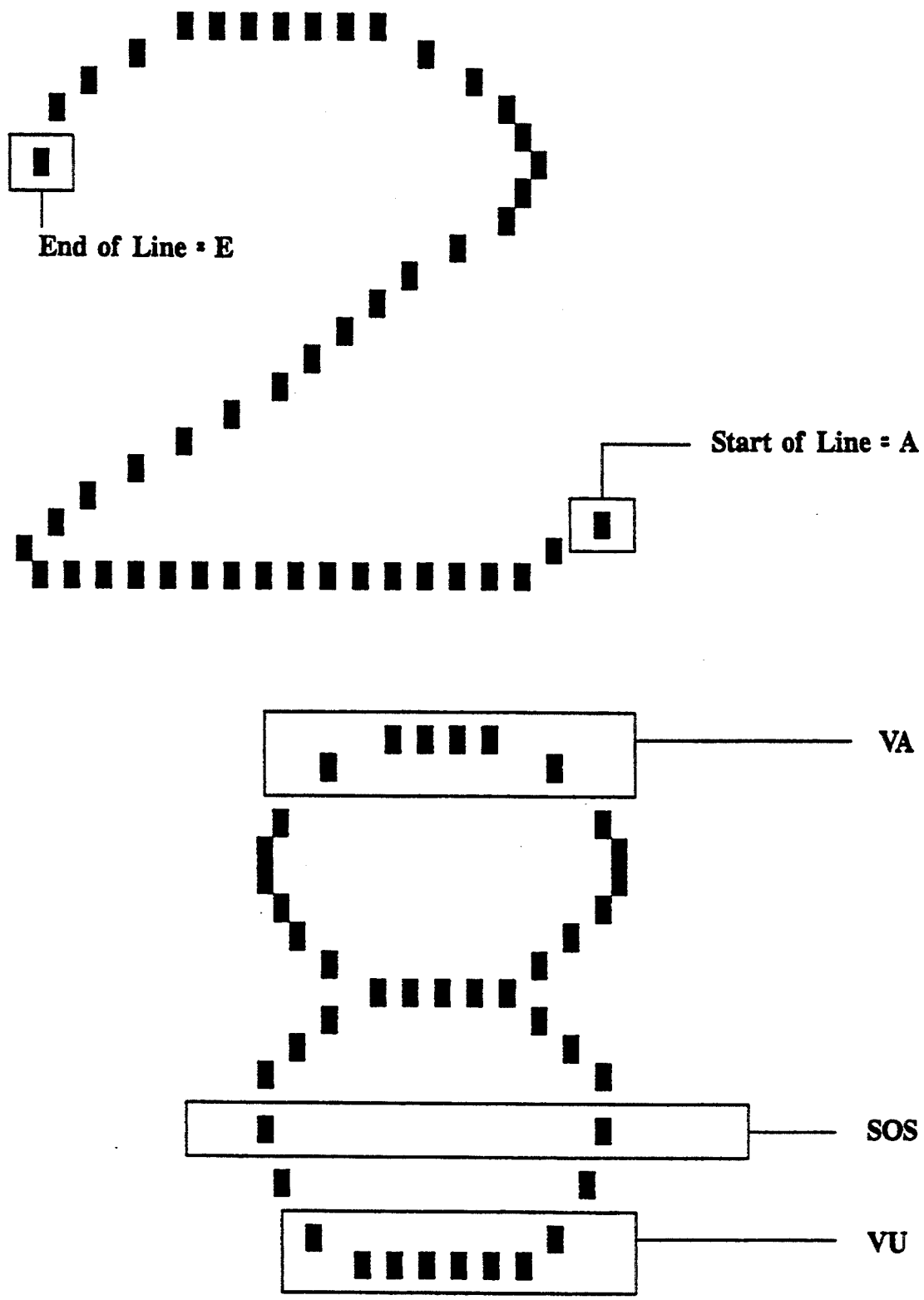
Figure 1H:
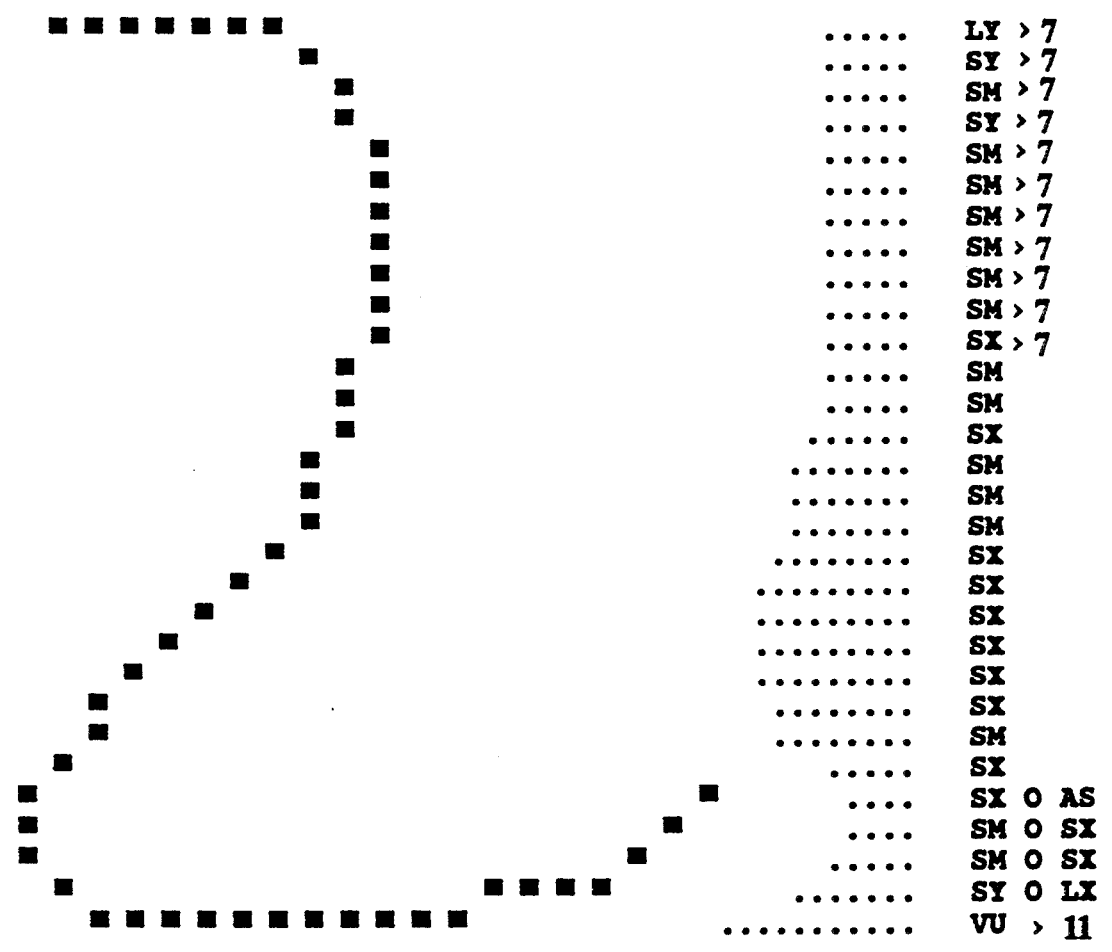
Figure 1I:
Figure 1J:
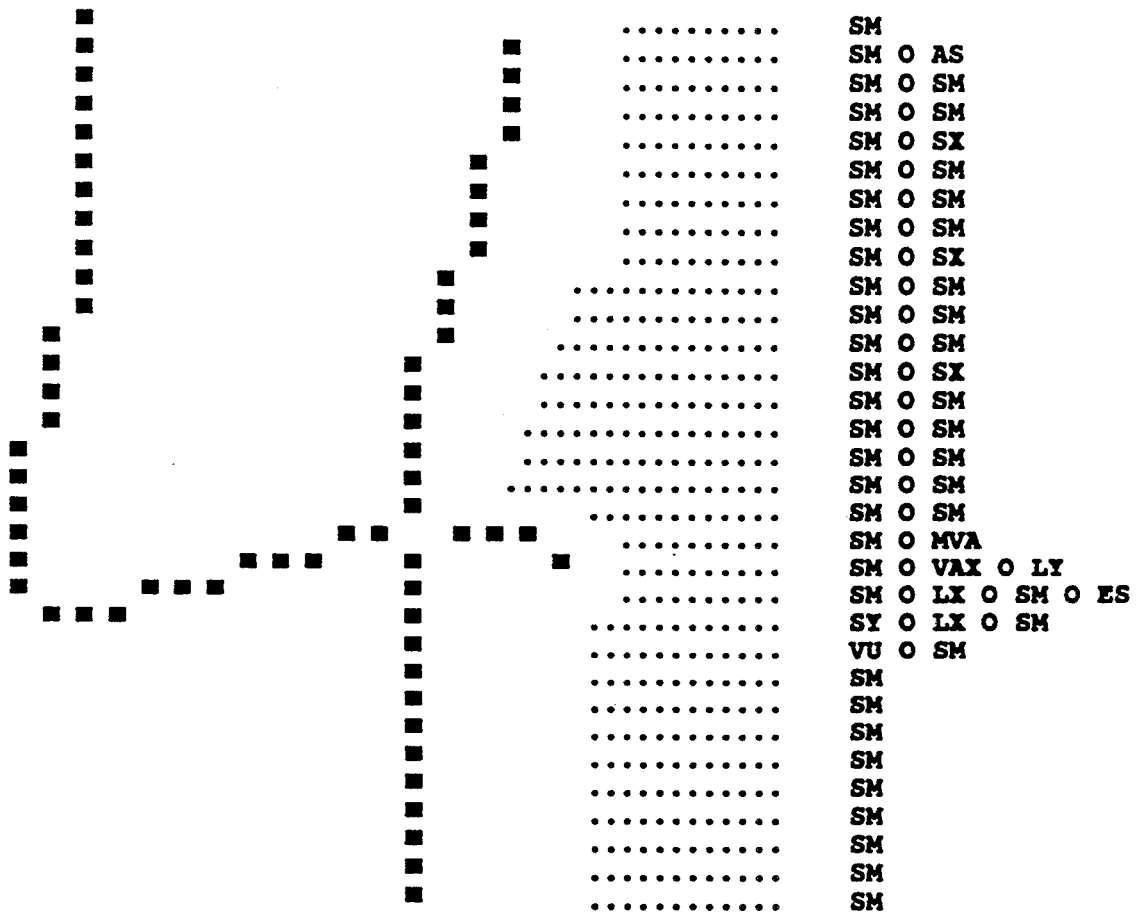
Figure 1K:
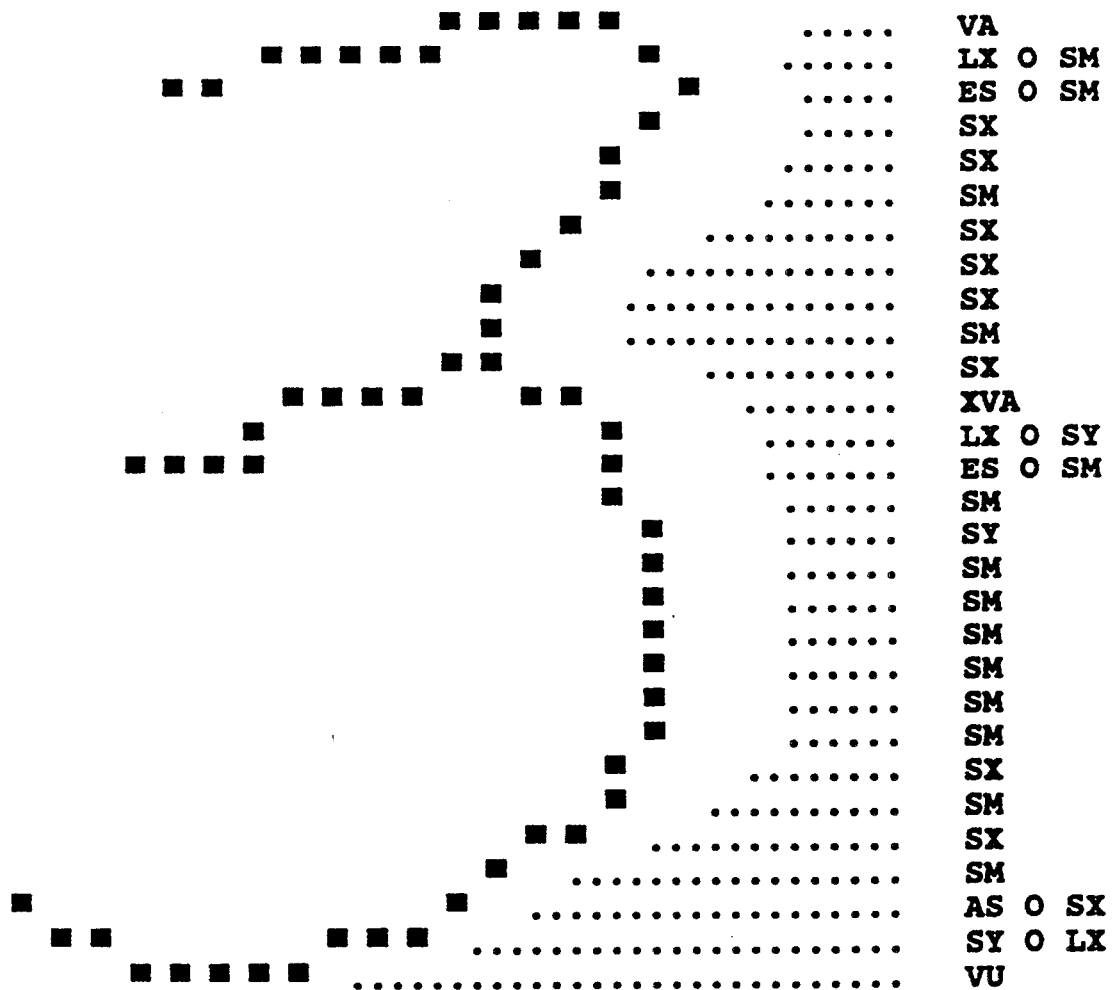
Figure 1L:
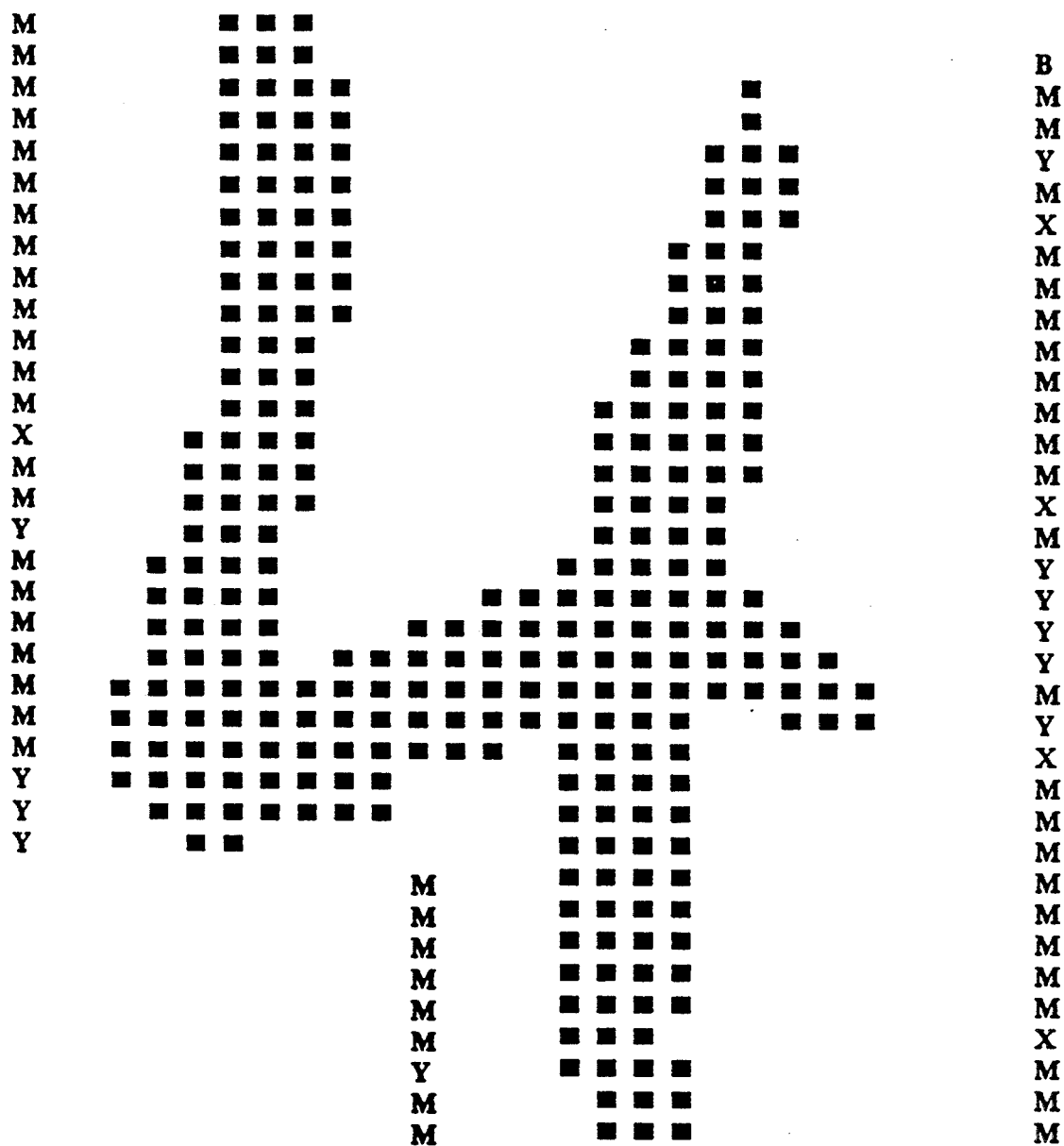
Figure 1M:
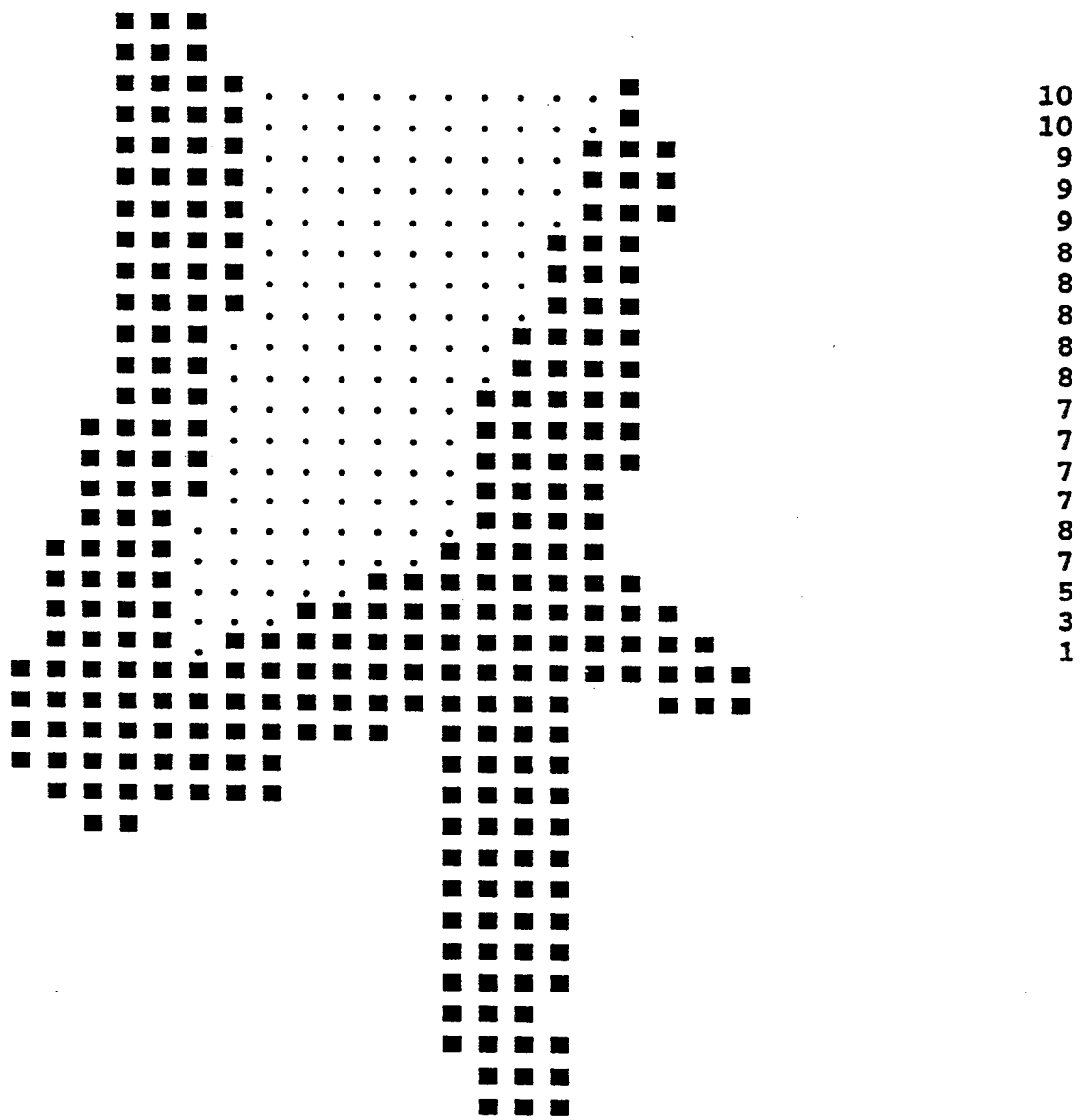

FIG. 1F illustrates some of these codes. There are single element codes such as "S" for a single unconnected pixel in a row and "O" for a single hole in a row. Where a hole is several columns long, it may be represented by the code "LO" followed by a symbol, ("<"). Following the code indicates the length of the element. Thus, LO<n is the connection code for a hole which is n elements long in a row of pixels. In summary, the following is a glossary of the connection codes:

Line Length Codes
S =   represents a single pixel or a length one pixel (1 column) long.
L =   represents a length two or more pixels long, the length being indicated by < followed by a numeral indicating the length and number of columns.
O =   represents a single hole
LO =  represents a hole two or more columns long, a < followed by a numeral indicates the length of the hole and number of columns.

Direction Indicating Codes.
X =   represents a connection to the left from an upper to a lower row
SX =  represents a connection from a single pixel row to the left
Y =   represents a connection to the right
M =   represents a straight down connection
SX, SY, represent single connections to the left,
and SM = right and straight down, respectively
LX, LY = indicate a connection from a polarity of pixels in a row to the left and to the right respectively.

Special Codes Include the Following.
A =   represents the start of a row
E =   represents the end of a row
VU =  represents a row with a connection to space pixels in a lower line
VA =  represents one or more pixels with connections to a lower line (VA and VU are opposite patterns, VU being a connection, for example a closing part of a character while VA is a projection which may be an upper part of a character)

Referring to FIG. 1.3.2, the special characters E and A are shown in the case of the (2). In the case of the (8), VA and VU connections are shown at the upper and lower parts of the (8). The lower loop of the (8) defines an "SOS" (or "LO") s connection. It will be apparent that a line can have a plurality of connection codes. Thus, the pixel matrix can be one dimensional, but is more likely to be two dimensional.

FIGS. 1.3H-K show three different characters and their connection codes. These codes define the pixel matrix of the particular characters illustrated. The pixel matrix of connection codes is two dimensional in these examples. It is desirable to present the pixel matrix in the form of a one dimensional character string, thereby reducing or compressing the connection codes for the character. This is done by computing one of the recognition tables which is the pixel matrix table. In computing the pixel matrix table, as shown at 30 in FIG. 1B, different codes are assigned which are referred to herein as MT codes. These codes then define a one dimensional matrix description of the character.

The recognition table of MT codes is generated in two operations. First, the computation of the connection codes to provide the pixel matrix, as shown at 29 in FIG. 1B, and then the assignment of the MT codes to form the MT code recognition table is shown at 30. These MT codes are selected, not only for reduction of the amount of data which is handled in recognition, but also for the purpose of enlarging the various patterns and shapes which can characterize particular characters in the set thereby reducing the number of operations (searching of recognition blocks in a recognition file, an exemplary file being reproduced below) needed in most cases to recognize a character. It is desirable to recognize a character without scanning the entire recognition file. The entire recognition file is scanned in its entirety only when a character cannot be recognized and is not found unrecognizable by a match with a block higher up in the file.

The system generates additional tables used in recognition so as to guard against misrecognitions as well as increase the recognition rate of the system. These tables contain front and rear view codes indicating the relationship in the direction in which the pixels are displaced along the left side (front view) and right side (rear view) of the bit map and of the pixel skeleton map. The bit map in work area (1) and the pixel skeleton in work area (2) are used to compute front and rear view codes from the bit map store and memory as shown at 32 and from the skeleton stored in memory as shown at 34. The direction codes are the letters A, L, X, M, Y, R and B for the front view. The same letters are used for the rear view. Each front view direction code is computed from the number of columns the end pixels in each row of adjacent successive rows are offset from each other. The computations also include limits which are parameters stored in memory upon initialization. The front view direction codes (ai) utilize the column location of successive lines (the i and i+1 lines) on the left side of the bit map in work area (1). The parameters are indicated as P1 and P2. These parameters set the limits or extent of change in shape and differentiate certain front and rear view codes.

FIG. 7A shows the front view codes and the computations thereof. It will be noted that these codes differ in terms of their relationship to the P1 and P2 parameters. The M code, as in the case of the connection codes, indicates a straight down connection. The direction codes obtained on scanning each of the rows in the work area are stored in a recognition table which is referred to as the FVDC Table A.

The rear view direction code RVDC Table B is obtained by the computations shown in FIG. 7B which are similar to those used computing the front view, but consider the location and column number of the pixels at the ends of successive adjacent rows starting from the top and going down to the bottom of the bit map in work area (1). As shown in FIG. 8, direction code strings defining the borders of the pixel skeleton are derived using the same equations as used in deriving the FVDC—Table A and RBDC—Table B. These recognition tables constitute direction codes (ci) and (di) and are strings contained in Table C and Table D of the recognition tables. For the bit map in work area (1) for a typical character, here the numeral 4 is shown in FIG. 1.4, adjacent each row on the left is a sequence of the codes which are in Table A for the front view string (ai). The string of codes on the right are the rear view codes which appear in Table B.

Referring to FIG. 6A, there is shown a program for the generation of the connection codes in the pixel matrix from the data in the pixel skeleton map. The rows of the map are scanned. These rows are referred to as lines in FIG. 6A. The first line scanned is the first line containing a pixel. Scanning continues until the last line containing a pixel is reached. This is denoted by the operation "while line not equal to last line of character". The lines are scanned from left to right as indicated by the operation "while current element not equal to last element (pixel) of line". The length of the elements are computed and the connection codes are computed from the line length codes and the current element (column position) of the pixels in the adjacent rows. The program loops until all of the lines are scanned. In addition to the single element codes, the following is a glossary of the connection codes. These codes may, in a computer which is capable of processing data in 32 bit bytes, be a byte position code which is set in one of the 32 bit positions for each of the connection codes. The single element codes were discussed above and are shown in FIG. 1F. The following is a more complete glossary of the direction codes.

| Direction Codes. | |
|---|---|
| SX = | left direction |
| LX = | left direction from line of more than one column of pixels |
| SM = | straight down direction |
| SY = | right direction from single pixel |
| LY = | right direction from a row having multiple pixels in succession |
| AS = | beginning of new line |
| LXA = | beginning of new line followed by connection to the left |
| LYA = | beginning of new line followed by connection to the right |
| ES = | end of a line |
| LXE = | end of the line which terminates a connection to the left |
| LYE = | end of a line which follows a connection to the right |
| LO = | holed line |
| EE = | empty line |
| VU = | bottom closed |
| VA = | top closed |
| MVA = | top closed by single pixel |
| XVA = | top closed via connection to the left |
| YVA = | top closed via connection to the right |
| VAM = | top closed to a single downward connection |
| VAX = | top closed from a connection to the left |
| VAY = | top closed with a connection to the right |
| MVU = | bottom closed with a connection to a single pixel below the line |
| XVU = | top closed with a connection to the left |
| YVU = | top closed with a connection to the right |
| VUM = | bottom closed to more than one pixel below the closure |
| VUX = | bottom closed via connection to more than one pixel on the left |
| VUY = | bottom closed via more than one pixel to the right |

Figure 1N:
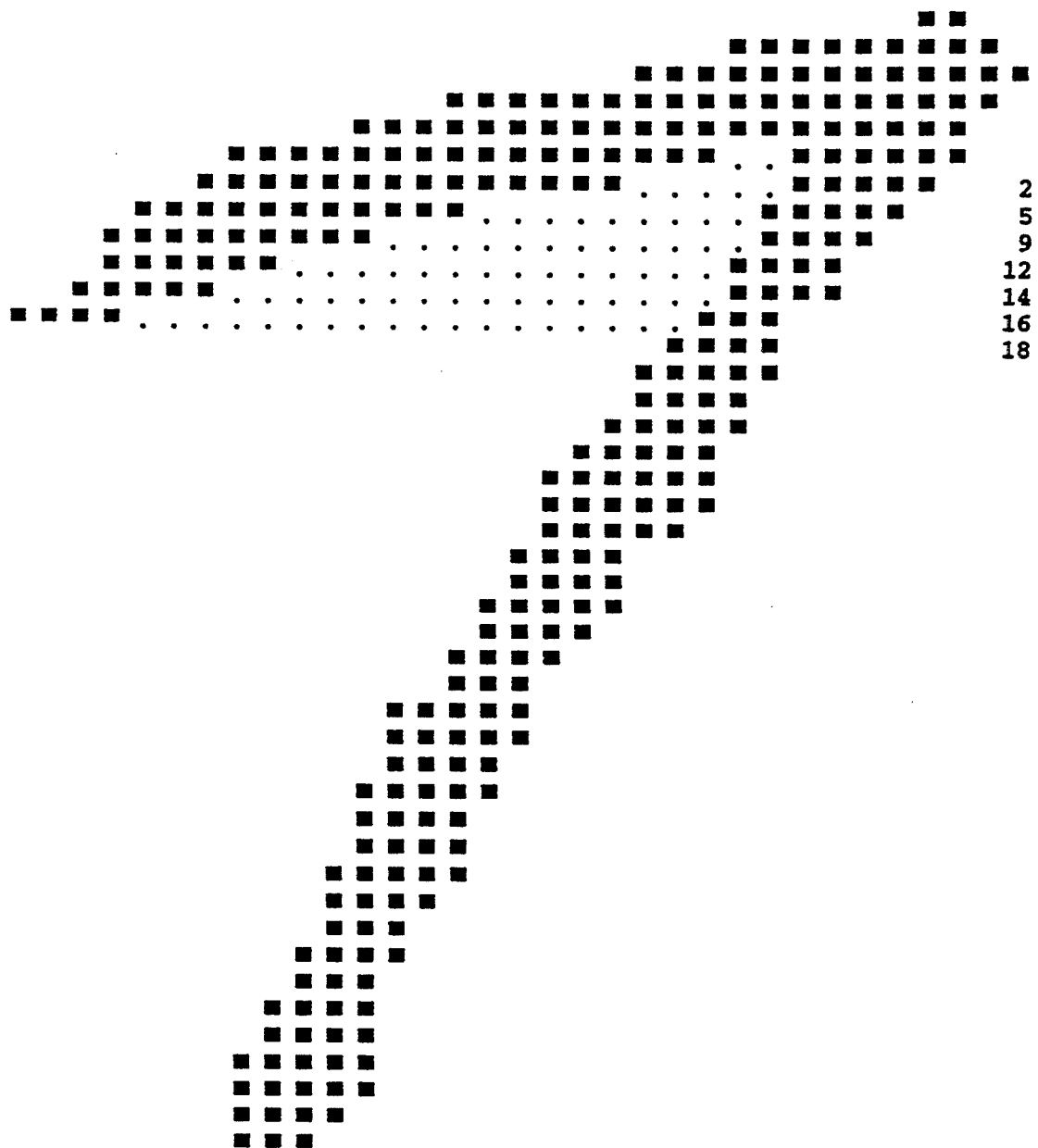

Additional recognition tables of additional strings of bytes are also computed to represent holes in the characters depicted by the bit map in working area (1). These are for holes open at the top and closed at the bottom as is the case for a numeral 4 shown in FIG. 1M. A separate table is computed for patterns which are open on the bottom, such as is the case for the numeral 7, as shown in FIG. 1N. These computations are indicated by the operation shown at 36 in FIG. 1B. As shown in FIG. 9, the bit map area (working area (1)) is scanned from the top row down and a string (STR-1) is computed in terms of the number of columns in the space between pixels and rows along the side of a hole open at the top. This string is stored in memory as the HOAT—Table E and the HOAB—Table F. There are, therefore, six recognition tables as well as the bit map and pixel skeleton which depict the character and which are useful for recognition.

Referring to FIG. 10, there is shown the routine for reducing the pixel matrix to a one dimensional code referred to as the MT codes. There is one MT code for each line of the pixel matrix. However, if the pixel matrix is ready encoded with connection codes, such as discussed above in connection with FIG. 6A, including the single element codes O, S, and M, then the reduction routine is not used and the recognition table consists of the connection codes which then constitute a string in one dimension. The reduction or recognition table program proceeds first to initialize the system by entering variables representing the MT codes. There may, in a 32 bit computer system, be up to 32 of such variables. The following is a table of such variables which are used in the herein described system.

| CODE TABLE | |
|---|---|
| VAR RS | |
| VAR LS | |
| VAR RA | |
| VAR LA | |
| VAR UR | :VU WITH JUMP TO THE RIGHT |
| VAR URS | :UR SMALL FOR SMALL NUMBERS |
| VAR LVA | : VA AT LEFT (VA O S) |
| VAR RVA | :VA TO RIGHT (S O VA) |
| VAR LL | : LONG LINE |
| VAR DL | :three lines parallel |
| VAR DD | :PARALLEL HOLE |
| VAR FRAG | :2 AND 7 BOTTOM AS ?/1 AND T TOP AS ? |
| VAR H | :HAKEN AN STRICH UNTEN |
| VAR ZERO | :0 |
| VAR Lm | :1,2 END CENTER LINE |
| VAR 2TOP | :2 TOP |
| VAR ZW | :SPECIAL 2 |
| VAR THREECENT | :3 CENTER |
| VAR SA | :4 LINE TO THE RIGHT |
| VAR VI | :4 |
| VAR FOUR | :4 AGAINST OPEN 9 WHICH LOOKS LIKE A FOUR AND FOR 4 CENT WITHOUT SA |
| VAR SIX | :6 WITH CIRCLE TO THE RIGHT INSTEAD OF RA |
| VAR SIT | :7 TOP |
| VAR 7CENT | :7 CENTER |
| VAR 7BOT | :7 BOTTOM |
| VAR VM | :8 CENTER |
| VAR EIGHT | :8 SPECIAL FORMS OF EIGHT |
| VAR NINE | :9 |
| VAR NINEBAD | :9 DEFENCE BAD 9 AGAINST 4 AND 5 |
| VAR XX | :FOR NOTHING |

Also, entered are MT blocks which relate the MT codes to different combinations of lines on the pixel matrix. In addition to MT blocks, there are entered on initialization MT lines which corollate individual lines of connection codes (not successive as in the case for MT blocks) to MT codes. Exemplary MT blocks and lines are shown in the following table. The MT blocks are plural lines which use a number of lines of the pixel matrix of connection codes. The blocks start and end with open and closed brackets ({,}) which depict the beginning and end of each block, these brackets are shown in the table depicting the blocks. The MT lines can translate the connection codes which consists of MT codes and connection codes which are obtained by a plurality of loops through the recognition table program. The program proceeds until all connection codes are translated. As noted above, translation can be into the MT codes contained in the code table or single connection codes such as the LO and SM codes. These translations are dictated by the MT rows and blocks. Exemplary MT blocks and rows appear in the following table entitled MT blocks or rows.

| MT BLOCKS OR ROWS |
| --- |
| MT { 4 CENTER |
| MT S O S ;LO (>2) |
| MT S O\|>4\| VA\|>3\| O SX ;LO |
| MT VU O S O\|<2\| S ;LO |
| MT ES O MVU ;VU |
| MT S ;SM |
| MT } |
| MT { :3 BOTTOM |
| MT VA\|<2\| ;SX |
| MT SLX\|<15\| O SY ;LX |
| MT } |
| MT { : 7 BOTTOM |
| MT SX,SM ;SM (>30) |
| XT SY ;7BOT (<3) |
| NT LY\|<4\| O\|<2\| AS ;7BOT |
| MT $VU ;7BOT |
| MT } |
| MT { : 7 BOTTOM |
| MT SX,SM ;SM (>25) |
| MT SY O\|<3\| LYA\|<4\| ;7BOT |
| MT $VU ;7BOT |
| MT } |
| MT { : 3 BOTTOM |
| MT S ;SX |
| MT VA\|<2\| ;SX |
| MT SX O ES ;SX |
| MT SLX\|>15\| ;LX |
| MT } |
| MT LXE O LYE ;Lm |
| MT LXE O\|<2\| LY ;Lm |
| MT LXE O S ;RS |
| MT VU O SM O ES ;ZW |
| MT SX O VU O LYE ;LYE |
| MT LO O VU O LY,LYE ;DD |
| MT DL O ES ;DD |
| MT LO O ES ;ZW  :2 Steve Mitte |
| MT { : 1 ENG OBEN |
| MT VA ;VA |
| MT LO ;LO (<5) |
| MT VA ;LO |
| MT } (10) |
| MT { : 7 OBEN |
| MT SX ;SY |
| MT VA ;LY |
| MT LXA O LOG ;LY |
| MT VU ;LY |
| MT } |

In carrying out the recognition table program, the pixel matrix is scanned for combinations of adjacent connection codes for rows which match the MT blocks in the order in which the MT blocks appear in the code table. The code table is the table of MT rows and blocks which is entered upon initialization of the system. As shown in FIG. 11A, the recognition process may involve entering not only all of the MT blocks and rows which define the code table, but also the recognition blocks which are referred to as MA blocks and exclusion blocks which exclude different characters and are invoked from MA blocks. FIG. 11A shows that the recognition table which contains the connection codes is scanned line-by-line, first when switched to the MT blocks and rows so that the pixel matrix can be reduced to the single dimensional string constituting the recognition table corresponding to the pixel matrix. The reduced data in that recognition table as well as the data in the other recognition tables for the borders of the pixel patterns in the bit map and skeleton map and the hole recognition tables E and F and even the bit maps in both working areas are available for use to obtain recognition of characters even of the highest level of difficulty of recognition.

Returning to FIG. 10A, the program is shown in greater detail for the development of the recognition table of MT codes. This program involves scanning the matrix line-by-line in order to match the MT blocks, then MT codes are stored by substituting an MT for a connection code in the pixel matrix. The pixel matrix is then scanned with the substituted MT codes, line-by-line until all lines having several connection codes are replaced with a single code, either from the MT table or another connection code.

Referring again to FIG. 1 and particularly to FIG. 1C, the recognition files (MA files) which are entered in memory on initialization are scanned as shown at 38, define a match with lines from or the entirety of strings in the recognition tables these recognition files contain successions of digital signals. Each succession is headed by MA or B in the representative recognition file presented below. These files are grouped in blocks. There are referred to as MA blocks which are assigned to different characters. There may be several MA blocks for each character. The MA blocks are grouped first to direct the system to index to the next character when, for example, all or most of the recognition table corresponding to the pixel matrix shows empty rows (code EE). The same operation is then carried out as would occur if a match were obtained from a MA block and the character was recognized, or, all of the blocks were scanned and the pattern was found to be unrecognizable. In other words, the durchlaeufer (runthrough in English) provides a quick jump to the next character field. (See FIG. 11.)

Similarly, there is another MA block known as the fraglich (or uncertain in English) block for codes indicating that the character is in the first instance unrecognizable. Thereby, avoiding the need to examine any further MA blocks for that character field and causing the program to index to the next character field. By indexing to the next character field is meant the page bit map of the character field is written into the 128×128 byte working area (1) in memory. Then the map is thinned using the routine shown in FIG. 5 to provide the pixel skeleton map in working area (2).

The recognition files include blocks referred to as B blocks since they all start with a letter B. They are identified by a name in the first line thereof and may consist of several parts, each ending with the code BE. The blocks are invoked by calls in the MA block. The blocks are exclusionary in nature. If a match of the recognition table information with a B block occurs, generally the character described by the MA block invoking the B block is excluded. Exclusionary B blocks for other characters may be invoked to recognize a character of interest. As shown in FIG. 12A, the recognition process generally proceeds through different levels, each containing groups of MA blocks. As explained in greater detail below, the successions are examined successibly. Each succession in each block is represented by data in the form of digital signals in the memory where the recognition file is stored. The MA blocks are separated by exclamation points (!) in the recognition file. An MA block which calls a B block is generally invoked first via the recognition file, then directs a jump to the blocks for another character in the set of the same level of difficulty to recognize, or if all MA blocks in the group for that level of difficulty have been scanned without finding the character to jump to the next group for the next higher level of difficulty. The MA blocks can, as shown for the O block for the first character, an 8 or acht, may invoke the front and rear view tables. The lines which invoke these tables are headed F&R.

There follows a representative file of MA and B blocks with an index indicating the type of blocks. The blocks for the lowest level of difficulty are indexed under numbered tabs on the left in the index 3–12. Not all characters in this set are deemed easy to recognize. Therefore, the next level of difficulty which includes some characters not in the first level, start at index Tab No. 11 and continue to Index Tab No. 22. Interspersed are the B blocks which are called from MA blocks. When recognition is found, the last line of the MA block is reached. In this last line appears the word "ergebnis" or result followed by a less than sign (<) with the character which is found.

INDEX OF THE NUMBER.TAB AFTER MT BLOCKS

|    |                              |                             | PAGE |
|----|------------------------------|-----------------------------|------|
| 1. | DURCHLAEUFER                 | JUMP TO ORDERED "+" SIGN    | 3    |
| 2. | FRAGLICH                     | NUMBER NOT RECOGNICABLE. GIVE * MARK TO NUMBER. | 3 |
| 3. | ACHT BLOCK                   | GENERAL FORM OF 8           | 3    |
|    | NULL BLOCK                   | GENERAL FORM OF 0           | 3    |
|    | SECHS BLOCK                  | GENERAL FORM OF 6           | 4    |
| 6. | DREI BLOCK                   | GENERAL FORM OF 3           | 4    |
| 7. | NEUN BLOCK                   | GENERAL FORM OF 9           | 4    |
| 8. | ZWEI BLOCK                   | GENERAL FORM OF 2           | 5    |
| 9. | 7-BLOCK NEXT                 | JUMP GENERAL FORM OF 7      | 5    |
| 10.| 7-BLOCK                      | GENERAL FORM OF 7           | 5    |
| 11.| EINS BLOCK                   | GENERAL FORM OF ONE.        | 6    |
| 12.| VIER BLOCK                   | GENERAL FORM FOR 4          | 6    |
| 11.| NULL                         | ZERO                        | 7    |
| 12.| EINS-D                       | EUROPEAN 1                  | 7    |
| 13.| EINS                         | US 1                        | 7    |
| 14.| ZWEI                         | TWO                         | 7    |
| 15.| DREI                         | THREE                       | 8    |
| 16.| VIER-B                       | ARCHITECTURAL 4             | 8    |
| 17.| FUENF                        | FIVE                        | 8    |
| 18.| SECHS                        | SIX                         | 9    |
| 19.| SIEBEN                       | SEVEN                       | 11   |
| 20.| ACHT                         | EIGHT                       | 11   |
| 21.| NEUN                         | NINE                        | 11   |
| 22.| NICHT ANFANG RECHTS          | NOT START FROM RIGHT SITE   | 12   |
| 23.| NICHT ANFANG LINKS           | NOT START FROM LEFT SITE    | 12   |
| 24.| NICHT ENDE RECHTS            | NOT END TO THE RIGHT        | 12   |
| 25.| NICHT ENDE LINKS             | NOT END TO THE LEFT         | 13   |
| 26.| NICHT NULL BLOCK             | NOT GENERAL FORM OF 0       | 13   |
| 27.| NICHT NULL                   | NOT 0                       | 13   |
| 28.| NICHT EINS-D                 | NOT EUROPEAN 1              | 14   |
| 29.| NICHT EINS BLOCK             | NOT GENERAL FORM OF 1       | 14   |
| 30.| NICHT EINS                   | NOT US 1                    | 15   |
| 31.| NICHT ZWEI                   | NOT 2                       | 15   |
| 32.| NICHT ZWEI BLOCK             | NOT GENERAL FORM OF 2       | 15   |
| 33.| NICHT FRAGLICH               | NOT "*" QUESTION MARK       | 16   |
| 34.| FRAGLICH                     | "*" QUESTION MARK           | 16   |
| 35.| FRAGLICH NEUBARBEITUNG SPAETER | "*" MARK                  | 16   |
| 36.| NICHT DREI                   | NOT 3                       | 17   |
| 37.| NICHT DREI BLOCK             | NOT GENERAL FORM OF 3       | 17   |
| 38.| NICHT VIER                   | NOT 4                       | 17   |
| 39.| NICHT VIER-B                 | NOT ARCHITECTURAL 4         | 18   |
| 40.| NICHT FUENF                  | NOT 5                       | 18   |
| 41.| NICHT SECHS                  | NOT 6                       | 18   |
| 42.| NICHT SECHS BLOCK            | NOT GENERAL FORM OF 6       | 18   |
| 43.| NICHT SIEBEN                 | NOT 7                       | 19   |
| 44.| NICHT SIEBEN BLOCK           | NOT GENERAL FORM OF 7       | 19   |
| 45.| NICHT ACHT                   | NOT 8                       | 19   |
| 46.| NICHT ACHT BLOCK             | NOT GENERAL FORM OF 8       | 20   |
| 47.| NICHT NEUN BLOCK             | NOT GENERAL FORM OF 9       | 20   |
| 48.| NICHT NEUN                   | NOT 9                       | 20   |
| 49.| ANFANG RECHTS                | START DIRECTION TO THE RIGHT| 21   |
| 50.| ANFANG SIEBEN                | 7 TOP                       | 21   |

| | | |
|---|---|---|
| 51. ANFANG LINKS | START DIRECTION TO THE LEFT | 21 |
| 52. SECHS OBEN | 6 TOP | 21 |
| 53. ZWEI MITTE | 2 CENTER | 22 |
| 54. DREI MITTE | 3 CENTER | 22 |
| 55. FUENF MITTE | 5 CENTER | 22 |
| 56. ENDE RECHTS | END TO THE RIGHT | 22 |
| 57. ENDE LINKS | END TO THE LEFT | 23 |
| 58. NULL | ZERO | 23 |
| 59. VIER OBEN | 4 TOP | 23 |
| 60. VIER MITTE | 4 CENTER | 24 |
| 61. SECHS MITTE | 6 CENTER | 24 |
| 62. SECHS UNTEN | 6 BOTTOM | 24 |
| 63. SIEBEN UNTEN | 7 BOTTOM | 25 |
| 64. SIEBEN-D | EUROPEAN 7 | 25 |
| 65. ACHT | EIGHT | 25 |
| 66. NEUN OBEN | 9 TOP | 26 |
| 67. NEUN UNTEN | 9 BOTTOM | 26 |
| 68. EINS-D | EUROPEAN 1 | 26 |
| 69. 9 NEW | 9 NEW | 27 |
| 70  9SPECIAL | 9 SPECIAL | 27 |
| 71. NEUN SPECIAL | NOT 9 SPECIAL | 28 |
| 72. 2NEW | 2 NEW | 28 |
| 73. NOT 2BACK | NOT 2 BACK | 28 |
| 74. 4 NEW | 4 NEW | 28 |
| 75. 3 NEW | 3 NEW | 29 |
| 76. 6NEW | 6 NEW | 29 |
| 77. 7NEW | 7 NEW | 29 |
| 78. 8NEW | 8 NEW | 30 |
| 79. 5NEU | 5 NEW | 30 |
| 80. NOT 5NEU | NOT 5 NEW | 30 |
| 81. DURCHLAEUFER 8 | JUMP TO 8 | 30 |
| 82. ONEWNEW | 0 NEW | 30 |
| 83. NOT ONEW | NOT 0 NEW | 31 |
| 84. OSTRICH | 0 WITH DASH THROUGH | 31 |
| 85. NOT OSTRICH | NOT 0 WITH DASH THROUGH | 31 |
| 86. 2END | 2 END | 31 |
| 87. NOT 2END | NOT 2 END | 32 |
| 88. JUMPER TO 5 | JUMP TO 5 | 32 |
| 89. 1NEW | 1 NEW | 32 |
| 90. NOT 1NEWNEW | NOT 1 NEW | 33 |
| 91. 3NEWNEW | 3 NEWNEW | 33 |
| 92. NOT 3NEWNEW | NOT 3 NEWNEW | 33 |
| 93. 3CENTER | 3 CENTER | 34 |
| 94. NOT 3CENT | NOT 3 CENTER | 34 |
| 85. 3 CENTER UP | 3 CENTER UPPER PART | 34 |
| 86. 3 CENTERRIGHT | 3 CENTER BACKSITE | 35 |
| 87. 3CENTDOWN | 3 CENTER LOWER PART | 35 |
| 88. 3END | 3 END | 35 |
| 89. NOT 3END | NOT 3 END | 35 |
| 90. 4PARALLEL | 4 PARALLEL FORM | 36 |
| 91. NOT 4PARALLEL | NOT 4 PARALLEL FORM | 36 |
| 92. 4NEWNEW | 4 NEWNEW | 37 |
| 93. NOT 4NEWNEW | NOT 4 NEWNEW | 37 |
| 94. 5NEWNEW | 5 NEWNEW | 37 |
| 95. NOT 5NEWNEW | NOT 5 NEWNEW | 37 |
| 96. 6NEWNEW | 6 NEWNEW | 38 |
| 97. 6TOP | 6 TOP | 38 |
| 98. N6NEWNEW | NOT 6 NEWNEW | 38 |
| 99. 6GESCHLOSSEN | 6 CIRCLE | 38 |
| 100. NOT 6GESCHLOSSEN | NOT 6 CIRCLE | 39 |
| 101. 7NEWNEW | 7 NEWNEW | 39 |
| 102. NOT 7NEWNEW | NOT 7 NEWNEW | 40 |
| 103. 7NEWTOP | 7 NEW TOP | 40 |
| 104. 7NEWCENTER1 | 7 NEW CENTER | 40A |
| 105. 7NEWCENTER2 | 7 NEW CENTER | 40A |
| 106. 7NEWBOTTOM | 7 NEW BOTTOM | 41 |
| 107. 8NEWNEW | 8 NEWNEW | 41 |
| 108. NOT 8NEWNEW | NOT 8 NEWNEW | 41 |
| 109. 0GESCHLOSSEN | 0 CIRCLE | 42 |
| 110. N0GESCH | NOT 0 CIRCLE | 42 |
| 111. 9NEWNEW | 9 NEWNEW | 42 |

| | | |
|---|---|---|
| 112. NOT 9GESCHLOSSEN | NOT 9 CIRCLE | 43 |
| 113. BOTTOM 9GESCHLOSSEN | 9 CIRCLE BOTTOM | 43 |
| 114. NOT 9NEWNEW | NOT 9 NEWNEW | 43 |
| 115. RAUS1 | GIVE ? MARK | 44 |
| 116. NEUN NEW TOP | 9 NEW TOP | 44 |
| 117. NEUN NEW BOTTEM | 9 NEW BOTTOM | 44 |
| 118. NEUN NEW HOLE | 9 NEW HOLE | 44 |
| 119. NOT NEUN NEW | NOT 9 NEW | 45 |
| 120. ZWEI NEW TOP | 2 NEW TOP | 45 |
| 121. ZWEI NEW BOTTEM | 2 NEW BOTTOM | 45 |
| 121. 2BACK TOP | 2 BACK TOP | 45 |
| 122. 2BACK CENTER | 2 BACK CENTER | 46 |
| 123. 2BACK BOTTOM | 2 BACK BOTTOM | 46 |
| 124. NOT ZWEI NEW | NOT 2 NEW | 46 |
| 125. DREI NEW TOP | 3 NEW TOP | 46 |
| 126. DREI NEW CENTER | 3 NEW CENTER | 47 |
| 127. DREI NEW BOTTOM | 3 NEW BOTTOM | 47 |
| 128. SECHS NEW TOP | 6 NEW TOP | 47 |
| 129. SECHS NEW CENTER | 6 NEW CENTER | 47 |
| 130. NICHT DREI NEW | NOT 3 NEW | 47 |
| 131. VIERLOCH:VIER NEW | 4 NEW HOLE | 48 |
| 132. NOT FUENF NEW | NOT 5 NEW | 48 |
| 133. NOT 2BACK | NOT 2 BACK | 48 |

Exemplary Recognition File (First page of file = 3)

```
                          3
                          DURCHLAEUFER
+RAUS
MA ? EE ()
MA EE (>15)
MA NEXT RAUS
!
────────────────────────────────────────────────────
+?                       :FRAGLICH
+Q
MA QNIFRA
MA NEXT 80
!
MA QFRAG1
MA NEXT OSTRICH
!
MA NOP(*/1)
MA QFRAG
MA ERGEBNIS <*/1
!
+Q
:════════════════════════════════════════════════════
+80                      :ACHT BLOCK
MA NOP(0--UNGESICHERTE FORM 8)
MA ? VA (<6)
MA VA
MA ? LO (<4)
MA LO,DL
MA GESCHLOSSEN(>6)
MA ? LO    (<6)
MA LO,DL
MA GESCHLOSSEN(>6)
MA VU
MA F(X[>1],M,A;>3-Y[>1],M,B;>2-X[>1],M,A;>3-Y[>0],B,M;>0)
MA R(Y[>1],M,B;>3-X[>1],M,A;>2-Y[>1],M,B;>3-X[>0],A,M;>0)
MA ?($)
MA ERGEBNIS <8/002
!
MA QNIAB
MA NEXT
!
+80
:════════════════════════════════════════════════════
```

```
+00                         :NULL BLOCK
MA QNINB
MA NEXT
!
MA NOP(0/01)
MA ? LO -SX,RA,LA (<8)
MA LO,DL
MA GESCHLOSSEN(>6)
MA VU
MA WENNICHT SA
MA WENNICHT LYE
MA ?($5)
MA ERGEBNIS <0/01
!
+00
:==========================================================

+60                         :SECHS BLOCK
MA QNISB
MA NEXT
!
MA NOP(6/01)
MA PF(X,M;>9-Y[>0],M;>1)
MA PR(Y;<3-X,M;>9-Y;>2-M,Y;>0-M,X[>3];>3)
MA ?($)
MA WENNICHT LA
MA ERGEBNIS <6/01
!
+60
:==========================================================
+30                         :DREI BLOCK
MA QNIDB
MA NEXT
!
MA NOP(3/01)
MA LY|>10|
MA SY,SM (>3)
MA [SX,LX,LXE],SM (>3)
MA [SY,LY],SM (>3)
MA ANZAHL(SY,>1)
MA [SX,LX,LXE],SM (>1)
MA ERGEBNIS <3/01
!
+30
:==========================================================
+90                         :NEUN BLOCK
MA QNINEB
MA NEXT
!
MA NOP(9/01)
MA VA
MA LO (>6)
MA VA
MA RS
MA NO
MA JUMP -100
MA VA
MA LO,DL,VM,DD
MA GESCHLOSSEN(>6)
MA ? S (<4)
MA S (>3)
MA LA
MA LO (<12)
MA VU
MA ERGEBNIS <9/01
!
+90
:==========================================================
```

```
+20                      ZWEI BLOCK
MA QNIZB
MA NEXT
!
!
MA NOP(2/01)
MA R(Y[>1],M;>2-X[>3],M;>4-B-Y;>3)
MA ?($)
MA ERGEBNIS <2/01
!
+20
:===============================================
+70                                    7-BLOCK NEXT
MA QNISIB
MA NEXT 10
!
+7A                              7B    7-BLOCK
MA NOP(7/01)
MA SM,&SY (>6)
MA RA
MA LO (>2)
MA DL
MA UR
MA NO
MA JUMP -100
MA S ()
MA RA
MA LO (>6)
MA VM ()
MA S ()
MA NO
MA JUMP -100
MA SM,SY (>6)
MA RA
MA LO
MA MTLINE SY O VAX
MA DL
MA NO
MA JUMP -100
MA SM,&SY (<9)
MA VIERLOCH(>14,<20;>8)
MA NO
MA JUMP -100
MA F(Y[>6],M;>7-B-M[>10],Y;>11)     :7 MIT LAENGSTRICH OBEN VORN
MA ?($)
MA ERGEBNIS <7/01
!
+70
:===============================================

+10              :EINS BLOCK
MA NOP(1/001)
MA PF(X;>4-Y;>1,<4-X[<4],M;>12,<20)
MA WF(X;<3)
MA WR(Y;<3)
MA PL($;<6)
MA ?($)
MA ERGEBNIS <1/001
!
+10
:===============================================
+40              :VIER BLOCK
MA QNIV
MA NEXT
!
MA NOP(4/01)
MA SX
MA VA
```

```
MA DL (>6)
MA NO
MA JUMP -100
MA VA
MA LO (>6)
MA SA
MA DL (<4)
MA LO (>6)
MA VM (>1)
MA NO
MA JUMP -100
MA ROWN(>30)
MA ? VA (<8)
MA VA
MA LO,DL (>4)
MA JUMP -3
MA GESCHLOSSEN(>4)
MA LOCH(2,2,<6,0,1)
MA ? S (<6)
MA S (>5)
MA NO R(Y-M;<5-Y-$)
MA NO R(Y-Y-$)
MA NO R(Y-M-Y-$)
MA ERGEBNIS <4/01                                      :4 93   :9 2
!
+40
:===================================================================
+0                      :NULL
MA NOP(0/1)
MA VA
MA LO (<16)
MA VU
MA ERGEBNIS <0/1
!
MA QNIN
MA NEXT
!
MA NOP(0/2)
MA QLO01
MA ERGEBNIS <0/2                                       :0 125
!
+0                              :+0
:===================================================================
+1D                             :EINS-D
MA QNIED
MA NEXT
!
MA NOP(1/1)
MA QED1
MA ERGEBNIS <1D/1                                      :1 353   :7 7
!
+1D
:===================================================================
+1                              :EINS
MA QNIE
MA NEXT
!
MA NOP(1/12)
MA QE01
MA ERGEBNIS <1/12                                      :1 107
!
+1
:===================================================================
+2                              :ZWEI
MA QAL01
MA NEXT
!
MA QNIZ
MA NEXT
!
MA NOP(2/5)
```

```
MA SY (>2)
MA SY,SM (<8)
MA RA
MA LO (<10)
MA VU
MA WENNDOLLAR
MA ERGEBNIS <2/5
!
+2
:================================================================

+3                                          :DREI
MA QAL01
MA NEXT
!
MA QNIDMI
MA NEXT
!
MA QNIEL
MA NEXT
!
MA NOP(3/1)
MA QAR01
MA QDMI01
MA QEL01
MA ERGEBNIS <3/1                                         :3 4199
!
+3
:================================================================
+4BAU               :VIER-B
MA QNIVB
MA NEXT
!
MA NOP(4/1)
MA QVIOB
MA QVIMI01
MA ERGEBNIS <4B/1                                    :4 137   :9 3
!
+4BAU
:================================================================
+5                                          :FUENF
MA QAR01
MA WENNICHT EE
MA NEXT
!
MA QNIAL
MA NEXT
!
MA QNIEL
MA NEXT
!
MA QNIF
MA NEXT
!
MA NOP(5/1)
MA QAL01
MA QFMI01
MA QEL01
MA ERGEBNIS <5/1                   :2 4   :3 2   :5 3168   :6 1
!
+5
:================================================================

+6                  :SECHS
+6DR
MA NOP(6/1)
MA LX              :DRUCK 6
```

```
MA SX,LX,SM (>3)
MA VA
MA LO (<14)
MA VU
MA ERGEBNIS <6/1
!
+6DR
+6I
MA QAR01.
MA WENNICHT SM SY SY SM SM
MA WENNICHT SY SY SM SM SM
MA NEXT
!
MA QNIS
MA NEXT
!
MA NOP(6/5)
MA QSO01
MA QS01
MA ERGEBNIS <6/5          :5 1  :6 613
!
MA NOP(6/6)
MA QSO01
MA QS01
MA QSU01
MA ERGEBNIS <6/6          :6 94
!
MA NOP(6/7)
MA SX,SM,SY (>4)
MA ANZAHL(SY,<3)
MA VA
MA LO (<13)
MA VU
MA ERGEBNIS <6/7
!
MA NOP(6/8)
MA VIERLOCH(>1,<7,<3)
MA NO
MA JUMP -100
MA SX,SM,SY (>10)
MA ANZAHL(SY,<3)
MA RA
MA LOK (<10)
MA VU
MA ERGEBNIS <6/8
!

MA NOP(6/11)
MA SX,SM,SY (>15)
MA ANZAHL(SY,<3)
MA ? DL (<8)
MA DL (>6)
MA ? VU (<3)
MA VU
MA ? SM (<3)
MA SM (<10)
MA ERGEBNIS <6/11
!
MA NOP(6/12)
MA SX,SM,SY (>15)
MA ANZAHL(SY,<3)
MA ? LO -LA (<4)
MA LO (>6)
MA ? VU (<3)
MA VU
MA ERGEBNIS <6/12
!
MA NOP(6/14)
MA SX,SM,LX,SY (>15)
```

```
MA ANZAHL(SY,<3)
MA ? LO -LA (<4)
MA LO (>6)
MA ? VU (<3)
MA VU
MA ERGEBNIS <6/14
!
MA NOP(6/15)
MA SX,SM,SY (>15)
MA ANZAHL(SY,<3)
MA ? DL -LA (<6)
MA DL (>6)
MA ? VU (<4)
MA VU
MA ERGEBNIS <6/15
!
+6
:===========================================
```

```
+7                          :SIEBEN
MA QAL01
MA NEXT
!
MA NOP(7/2)
MA QAR02
MA S (>9)
MA ? LYE,LY (<4)
MA LYE,LX
MA ? LXE≠(<4)
MA LXE
MA S (>9)
MA ERGEBNIS <7/2
!
+7
:===========================================
+8                                :ACHT
MA QNIA
MA NEXT
!
MA NOP(8/1)
MA QA01
MA ERGEBNIS <8/1             :8 1152
!
+8
:===========================================
+9          :NEUN
+91
MA NOP(9/1)
MA VA
MA LO ()
MA VU
MA S (>6)
MA VA
MA NO
MA JUMP -100
MA VA
MA LO,DL
MA GESCHLOSSEN(>10)
MA NICHTLOCH(2,2,>6,0,1)
```

```
MA VU,UR
MA SX,SM (>13)
MA ?($)
MA WENNICHT SA
MA ERGEBNIS <9/1
!
MA QNINE
MA NEXT
!

MA NOP(9/2)
MA QNE01
MA QNEU01
MA ERGEBNIS <9/2                                        :9 133
!
MA NOP(9/3)
MA QNE02
MA QNEU01
MA ERGEBNIS <9/3                                        :9 7
!
+9
:================================================================
B QNIAR                 :NICHT ANFANG RECHTS
B XXXXX
BE
!
:================================================================
B QNIAL                 :NICHT ANFANG LINKS
B SX,LX (<6)    :1
B LA
BE
!
:================================================================
B QNIER                 :NICHT ENDE RECHTS
B GOTO $4       :1
B SM
B SM
B SX
B SY
B SY
BE
B GOTO $        :2
B JUMP -5
B SM
B SM
B SM
B SY
B SY
B SY
BE
!
:================================================================

B QNIEL                 :NICHT ENDE LINKS
B GOTO $1       :1
B SM
B SM
BE
B ? SM,SM ()    :2
B SM,SX (>9)
```

```
B SY
B SM (>1)
B SX (<3)
B WENNDOLLAR
BE
!
:===========================================================
B QNINB              :NICHT NULL BLOCK
B VA
B LO
B LS
BE
B VA
B LO,DL (>3)
B MTLINE LOG O VA
BE
!
:===========================================================
B QNIN               :NICHT NULL
B VA
B LO ()
B RS
B S (>15)
B LA
B LO (<4)
B VU
BE
B VA
B LO (<4)
B RS
B S (>15)
B LA
B LO (<6)
B VU
BE
!
:===========================================================

B QNIED              :NICHT EINS-D
B SX (<3)
B VAX|>6|
B JUMP -100
B FRONT SX (<3)
B FRONT SM
B FRONT LX
B FRONT LXE|>6|
BE
B ? LO ()
B LO ()
B LOCHLAENGE(3,>7)
B LOCHLAENGE(4,>12)
!
:===========================================================
B QNIED1
B XXXX
BE
!
:===========================================================
B QNIEB                        :NEB   NICHT EINS BLOCK
B ? ZW ()
B ZW
B DL
B ZW ()
```

```
B WENNDOLLAR
BE
B ? VA (>10)
B VA
B LO
B LS
B SM ()
!
:===========================================================
B QNIE                    :NICHT EINS
B WENN LY LY    :1
BE
B WENN SX       :3
B WENN N^ SM SY SY SM N$           :wegen 3
BE
!
:===========================================================

B QNIZ                    :NICHT ZWEI
B FRONT VA¦<2¦
B FRONT LX¦<5¦  (<4)
B FRONT SX (>1)
B FRONT LX¦<4¦  (<4)
B FRONT ES
B JUMP -100
B BACK VA
B BACK SM (<5)
B BACK SX
B BACK SM (<3)
B BACK SX
B BACK SM
BE
B FRONT VA
B FRONT LX,SX (<5)
B FRONT AS
BE
!
:===========================================================
B QNIZB                   :NICHT ZWEI BLOCK
B LY¦<7¦        :1
B JUMP -1
B LY¦>5¦
B SY
B SM,SX (<25)
B ANZAHL(SX,<4)
B Lm ()
BE
B ? SX,SM ()    :2
B SX,SM (>10)
B SY (<4)
B WENNDOLLAR
!
:===========================================================
B QNIFRA                  :NICHT FRAGLICH
B WENN VM       :1
B WENNICHT VM LO RS
BE
B WENN SA       :2
BE
B WENN 7CENT    :3
!
:===========================================================
```

```
B QFRAG                               :FRAGLICH
B R(Y;<4-M;>1-X[>15],M[<4];>15-Y;<3)  :1  :7 GEGEN 2
B ?($)
BE
B VA         :2
B FRAG
B LO
B RS
B SX,SM (>6)
BE
!
:------------------------------------------------------------------
B QFRAG1                              :FRAGLICH NEUBEARBEITUNG SPAETER
B LY|<7|     :1
B JUMP -1
B LY|>5|
B ROWN(>18)
B ROWN(<27)
B R(Y-M-M-$)
B ?($)
BE
B VA|<7|     :2
B JUMP -1
B VA|>5|
B PF(M,X;<9-Y-M,X,Y[<3];>15)
B ?($)
BE
!
:==================================================================
B QNIDMI            :NICHT DREI
B WENN SM SM SM SM SM SM SX SX $    :1
BE
B GOTO $18   :3
B SM,SX,SY ()
B ANZAHL(SX,<3)
B ANZAHL(SY,<2)
B WENNDOLLAR
BE
!
:==================================================================
B QNIDB             :NICHT DREI BLOCK
B WENN ^ SY SY SY LY|>4| SY   :3
BE
B ? VM  :4       VON OBEN !!!
B VM
BE
!
:==================================================================

B QNIV              :NICHT VIER
B ? LA ()
B LA
B DL
B LO
B DL (>1)
BE
B FRONT LX
B FRONT SX (>5)
B FRONT SM (>1)
B FRONT SX
B FRONT SM (>1)
B FRONT SX
B FRONT SM (>2)
B FRONT SY (>2)
B JUMP -100
B BACK ? AS ()
B BACK AS
B BACK SX
```

```
B BACK SM
B BACK SX (>1)
B BACK SM (<4)
B BACK SX (>3)
B BACK S ()
B WENNDOLLAR
BE
!
:===============================================
B QNIVB              :NICHT VIER-B
B ? LYE ()
B LYE
B MTLINE AS O SX
B VU
B ROWN(<20)
BE
B ? LO () :1
B LO ()
B ANZAHLV(4,LINKS,>3)
B ANZAHLH(4,RECHTS,>0)
B ANZAHLH(4,SENKRECHT,<4)
B WENNICHT SA
B NICHTLOCH(2,4,<11,0,1)
BE
!
:===============================================
B QNIF               :NICHT FUENF
B SX
B SM (>1)
B SX
B SM (>3)
B SY
BE
B SX,SM (<6)
B LA
BE
!
:===============================================
B QNIS               :NICHT SECHS
B SM,SX (>9)
B ANZAHL(SX,<3)
B VAM¦>3¦
BE
B SM (>4)
B VA
B MTLINE SX O YVU
BE
!
:===============================================
B QNISB              :NICHT SECHS BLOCK
B WENN ES SM
BE
B LX,SX,SM,SY (>3)   :1
B RA
B LO (<10)
B VM (<8)
B LO (>4)
B VU
BE
!
:===============================================
B QNISI              :NICHT SIEBEN
B VA
B RS
B LO
B YVU
B SM
BE
B ? VA (>10)
B VA
B MTLINE LX O LYE
```

```
B LX
B SX (>5)
BE
!
:================================================
B QNISIB1           :NICHT SIEBEN BLOCK
B XXXX
BE
!
:................................................
B QNISIB
B GOTO $2
B LVA
B DL
B VU
BE
B WENN ^ VA VA
BE
!
:================================================
B QNIA              :NICHT ACHT
B VA
B LO ()
B RS
B S (>10)
B RA
BE
B FRONT VA
B FRONT SX,SM ()
B FRONT SY,SM ()
B FRONT VU
B JUMP -100
B BACK VA
B BACK SY,SM ()
B BACK SX,SM ()
B BACK LX
B BACK VU
BE
!
:================================================
B QNIAB                     :NAB  NICHT ACHT BLOCK
B ? SA ()
B SA
B LO (<7)
B VU
BE
B VA
B LO (<4)
B VM (<4)
B LO ()
B VU
B ROWN(>29)
BE
!
:================================================
B QNINEB         :NICHT NEUN BLOCK
B FRONT VA|<7|
B FRONT SX (>7)
B JUMP -100
B BACK VA
B BACK SM (>9)
BE
B BACK VA
B BACK SM (>2)
B BACK SX,SM (>7)
B BACK ANZAHL(SM,<3)
B BACK SY
B BACK SM
B BACK SY (>4)
BE
!
:================================================
```

```
B QNINE                             :NICHT NEUN
B ? RS ()
B RS
B ? RA ()
B RA
BE
B VA
B LO (>4)
B VU
B S (>5)
B VA
BE
!
:===============================================================
B QAR01              :ANFANG RECHTS
B LY
B S (<6)
B LXE
B SY ()
BE
B LY|>10|            :2
B LY ()
BE
!
:===============================================================
B QAR02              :ANFANG SIEBEN
B VA                 :1
B SIT ()
B RS
BE
B LY|>25|            :3
B WINKEL(70,100)
B SY (<4)
BE
!
:===============================================================
B QAL01              :ANFANG LINKS
B ? EE (<8)   :3
B EE ()
BE
B LX|<4|
B SX,SM
B VA
B LO (>1)
B RS
B NO
B JUMP -100
B ? LX -LM,SY,LY,RS,RA,VA,LS,LL,LXE (<4)     :4
B LX
B NOT RA,RS,VA,LXE
BE
!
:===============================================================
B QSO01              :       SO SECHS OBEN
B LX,SX,SM (>5)   :1
B SY,SM ()
BE
B LX,SX,SM (>5)   :2
BE
!
:...............................................................
B QSO02
B XXXX    :1
BE
!
:===============================================================
B QZMI01             :ZWEI MITTE
B [SY,LY],SM ()      :1
B ? SX -RA,LO (<3)
B [SX,LX,LM],SM (>3)
B ANZAHL(SX,>3)
```

```
BE
B [SY,LY],SM ()       :2
B SX
B SY
B SX,SM ()
BE
!
:===============================================================
B QDMI01           : DREI MITTE
B [SY,LY],SM,LYE ()    :1
B [SX,LS,LX,LM,LXE],SM ()
B ? SY,LY -Lm,THREECENT (<7)
B [SY,LY],SM (>1)
BE
B &SX,LS,LX,LXE,SM ()   - :2
B ? SY,LY -RA,UR,DD,LA,VU ()
B SY,LY,SM (>1)
BE
!
:===============================================================
B QFMI01           :FUENF MITTE
B ? SY,LY -LXE ()      :1
B SY,LY,SM (>1)
B NOT RA
BE
B ? SX (<5)    :2
B [SX,LS,LM],SM ()
B ? SY,LY -RA,LXE (<7)
B [SY,LY],SM RA (>1)
B ? SX -XX ()
BE
!
:===============================================================
B QER01                :ENDE RECHTS
B ? ZW ()              :3
B ?($) -LA
BE
B GOTO $               :5
B JUMP -12
B ? VA,LVA ()
B VA,LVA
B LO ()
B LS
B SX,LX (<5)
B WENNDOLLAR
BE
!
:===============================================================
B QEL01            :ENDE LINKS
B NOT LS     :1
B GOTO $
B JUMP -8
B ? LX,SX -UR ()
B [LX,SX,LXE],SM ()
B GOTO $ -VA,RA,RS,SY,LY,LYE,UR
B ?($) -RA,RS,SY,LY,LYE,Lm
BE
!
!
:===============================================================
B QLO01            :NULL
B ? VA (<4)     :1
B VA
B LO,DL (>4)
B ? VU (≤2)B VU
BE
B VA                :2
B ? LO,DL (<4)
B LO,DL (>4)
B ? VU (<2)
B VU
```

```
BE
!
:==========================================================

B QVIO01            :VIER OBEN
  B LX|<4|                   :1
  B SX,SM ()
  B RA,LA
  B LO,DL (>3)
  BE
  B SY,SM ()           :2
  B SX,SM ()
  B RA,LA
  B LO,DL (>3)
  BE
  !
:==========================================================
  B QVIMI01           :VIER MITTE
  B ? VU,VM -SA (<4)          :2
  B VU,VM ()
  B SX
  B ? LY,LYE
  B LY,LYE
  B S (>1)
  B WENNDOLLAR
  BE
  B ? VU,VM -SA (<4)          :3
  B VU,VM ()
  B SY
  B ? LY,LYE (<3)
  B LY,LYE
  B S (>1)
  B WENNDOLLAR
  BE
  !
:==========================================================
  B QS01              :SECHS MITTE
  B RA               :1
  B DL (>3)
  B VU,LL ()
  BE
  B ? RA,RS (<4)      :2
  B RA,RS
  B ? DL (<4)
  B DL (>1)
  B ? LO (<4)
  B LO ()
  B ? VU,LL (<3)
  B VU,LL ()
  BE
  !
:==========================================================
  B QSU01             :SECHS UNTEN
  B SM (>2)           :1
  B SY (<5)
  B WENNDOLLAR
  BE
  B ? SM (<3)    :2
  B SM (<8)
  B WENNDOLLAR
  BE
  !
:==========================================================
  B QSIU01            :SIEBEN UNTEN
  B SX,SM ()          :1
  B SY,SM (<5)
  B WENNDOLLAR
```

```
BE
B SX,SM ()              :2
B SY
B SM (>2)
B SY
B LY
B WENNDOLLAR
BE
!
:===========================================================
B QSID01           :SIEBEN-D
B ? RA,VA,VU,RS,DD,Lm,LM,LA,LY,LX,EL,LYE -LS,LA,7CENT ()    :1
B RA,VA,VU,RS,DD,Lm,LM,LA,LY,LX,EL,LYE ()
B ? SY,SM,SX (<6)
B SY,SM,SX (>6)
B ANZAHL(SY,<3)
B WENNDOLLAR
BE
B ? SX,SM -RA,LA,ZW,DL (<2)         :2
B SX,SM ()
B SY
B SX,SM (>2)
B WENNDOLLAR
BE
!
:===========================================================
B QA01                  :ACHT
B ? VA (<6)    :1
B VA
B JUMP +4
B ? LO,DL,DD,UR (>2)
B LO,DL,DD,UR ()
B ? VM (<8)
B VM ()
B ? LO (<5)
B LO,XX (>3)
B VU
BE
B S,L (<10)          :2
B ? RA,LA
B RA,LA
B ? LO,DL,DD
B LO,DL,DD (>5)
B ? VM (<8)
B VM ()
B ? LO (<10)
B LO (>3)
B VU
BE
!
:===========================================================
B QNE01                        :NEUN VA OBEN
B ? VA (<8)         :1
B VA
B LO,DL,VM,DD (>3)
B ? VU,UR,NINEBAD (<4)
B VU,UR
B SY
BE
B ? VA (<8)
B VA
B LO,DL,VM,DD (>3)
B NICHTLOCH(3,2,>6,5,1)
B ? VU (<4)
B VU
BE
!
:===========================================================
B QNEU01              :NEUN UNTEN
B GOTO $ -RA,LXE,RS         :1
B LX|>3|
```

```
B WENNICHT VU SX SX LX $
B WENNICHT VU SX LX $
BE
B GOTO $ -RA,RS              :2
B JUMP -14
B ? LA ()
B LA
B GOTO $ -RA,RS,SY,LY,SX,LX
B VU
BE
!
:===============================================================
B QED1                   :EINS-D
B ? VA (<10) :1
B VA¦<5¦
B ? RS,LS -DL
B RS¦<7¦,LS
B ? S -SY,LY,LA,VA,VU,RA,RS,LS,LX
B S ()
B JUMP -2
B SM
B SM
B Lm ()
B PRUEFEU1(38,100)
B WENNDOLLAR
BE
B ? VA (<10)             :2
B VA¦<7¦
B ? RS,LS -DL,VA ()
B RS¦<5¦,LS
B JUMP -2
B LOO
B JUMP +2
B LOCH(1,2,<8,0,1)
B LOCHLAENGE(4,<10)
B WINKEL(10,69)
B ? SX,SM SY,LY,LA,VA,VU,RA,RS,LS,LX ()
B SX,SM
B S ()
B WENNDOLLAR
BE
!
:===============================================================
+9NEW                                    :9 NEW
MA N9NEW
MA NEXT
!
MA Q9NEWTOP
MA Q9NEWBOT
MA ERGEBNIS <9/NEW
!
+9NEW
:===============================================================
:                                        9SPECIAL
+9SPECIAL
MA QN9SPECIAL
MA NEXT
!
MA NOP(9/SPECIAL)
MA ? UR (>7)
MA UR
MA SX,SM (>8)
MA WENNDOLLAR
MA JUMP -100
MA Q9NEWHOLE
MA WENNICHT ^ SM SM SM
MA WENNICHT ^ LY
MA WENNICHT ^ VA RS
MA ERGEBNIS <9/SPECIAL
!
+9SPECIAL
:===============================================================
```

```
B QN9SPECIAL                    :NOT NEUN SPECIAL
B VIERLOCH(>10,<30;>9)
BE
B VIERLOCH(>8,<15;>10)
BE
!
:================================================================
+2NEW                           :2NEW
MA QN2NEW
MA NEXT
!
MA NOP(2/A0001)
MA R(Y[>2],M;>5-X[>2],M;>5-Y;>0-B-A)
MA ?($)
MA ERGEBNIS <2/A0001
!
:================================================================
B QN2BACK                       :NOT 2BACK
B VA
B SIT (>4)
B RS
B SX,SM (>12)
B RA
B LO
B LOCHLAENGE(1,<6)
B VU
B JUMP -100
B BACK ? LYA ()
B BACK LYA|^4|
BE
B GOTO $1
B MTLINE LXA O YVA
B VU
BE
!
:================================================================
+4NEW                           :4 NEW
MA NOP(4/A1)
MA SM ()
MA VA
MA FOUR ()
MA VU
MA SM (>1)
MA WENNDOLLAR
MA ERGEBNIS <4/A1
!
MA VA
MA VI (>6)
MA LO,DL,RA,SA,LL (>6)
MA VU
MA S (>5)
MA WENNDOLLAR
MA ROWN(>33)
MA ERGEBNIS <4/A2
!
+4NEW
================================================================
+3NEW                           :3 NEW
MA NOP(3/A1)
MA QAR01
MA Q3NEWCENT
MA QEL01
MA ERGEBNIS <3/A1
!
MA NOP(3/NEXT)
MA QN3NEW
MA NEXT
!
+3NEW
:================================================================
+6NEW                           :6NEW
```

```
MA ? LA (>10)
MA LA
MA NO
MA JUMP -100
MA NOP(6/A1)
MA PR(Y-X,M;>15-Y;>1-M;>3-X;>3)
MA ?($)
MA WENNICHT LX $
MA ERGEBNIS <6/A1
!
MA NOP(6/A3)
MA Q6NEWTOP
MA Q6NEWCENT
MA ERGEBNIS <6/A2
!
+6NEW
:================================================
+7NEW                    :7NEW
MA ? 7CENT (>10)
MA 7CENT (>2)
MA SM,SX (>8)
MA SY
MA LY
MA ERGEBNIS <7/A2
!
MA VA
MA SIT
MA RS
MA S ()
MA WENNDOLLAR
MA ROWN(<20)
MA ERGEBNIS <7/A3
!
+7NEW
:================================================
+8NEW                    :8NEW
MA PF(X[>3],M;>4-Y[>3],M;>4-X[>3],M;>4-Y[>3],M;>4)
MA PR(Y[>3],M;>4-X[>3],M;>4-Y[>2],M;>4-X[>3],M;>4)
MA ?($)
MA ERGEBNIS <8/A1
!
+8NEW
:================================================
+5NEU            :5NEU
MA QN5NEU
MA NEXT
!
+5NEU
:================================================
B QN5NEU         :NOT 5NEU
B SX (<3)
B LA
B LO
B VM
BE
B SY ()
BE
!
:================================================
:                        DURCHLAEUFER 8
MA ? VM ()
MA VM ()
MA LO (>6)
MA VU
MA NEXT 8NEWNEW
!
:================================================
+0NEWNEW                 :0NEWNEW
MA Q0NEW
MA NEXT
!
```

```
MA ? VA (<6)
MA VA
MA &LOG,LO ()
MA LS
MA SM,&SX (<11)
MA RA
MA ? LOK ()
MA LOK (>3)
MA VU
MA ERGEBNIS <0/NEWNEWNEW1
!
+ONEWNEW
:=============================================================
:                              NOT ONEW
B QNONEW
B ? UR ()
B UR
B S (>10)
BE
B GOTO $9
B S (>9)
BE
!
:=============================================================
:                              OSTRICH
+OSTRICH
MA QNOSTRICH
MA NEXT
!
MA ? DL ()
MA DL (>14)
MA ?($)
MA ERGEBNIS <0/STRICHSTRICH1
!
+OSTRICH
:=============================================================
:                              NOT OSTRICH
B QNOSTRICH
B ? UR ()
B UR
B S (>10)
BE
B ? UR ()
B UR
B SX,SM (>7)
B ANZAHL(SX,<2)
B WENNDOLLAR
BE
!
:=============================================================
:                              2END
+2END
MA QN2END
MA NEXT
!
MA VA
MA LO ()
MA RS
MA SM,SY ()
MA ANZAHL(SY,>4)
MA &LVA,SX,SM ()
MA LO ()
MA VU
MA WENNDOLLAR
MA ERGEBNIS <2/ENDENDEND1
!
+2END
:=============================================================
B QN2END                      :NOT 2END
B FRONT VA
```

```
B FRONT LX,SX (<5)
B FRONT AS
BE
B VA
B SIT (>4)
B RS
B SX,SM (>12)
B RA
B LO
B LOCHLAENGE(1,<6)
B VU
B JUMP -100
B BACK ? LYA ()
B BACK LYA|^4|
BE
!
:===============================================================
:                           JUMPER TO 5
+JUMP
MA LX (>2)
MA NEXT 5NEWNEW
!
MA LX|>7|
MA NEXT 5NEWNEW
!
+JUMP
:===============================================================
+1NEWN
:                                              :1NEW
MA ? FRAG ()
MA FRAG (>1)
MA WENNDOLLAR
MA NEXT
!
MA QN1NEWN
MA NEXT
!
+1NEWN
:===============================================================
:                           NOT 1NEWNEW
B QN1NEWN
B FRONT VA|>3|
B FRONT SX|>1|
B FRONT SX
B FRONT SX|>1|
B JUMP -100
B BACK VA
B BACK LY
B BACK SM (>3)
BE
B GOTO $5
B SX ()
B LX|>6|
B WENNDOLLAR
BE
!
:===============================================================
:                           3NEWNEW
+3NEWNEW
MA QN3NEWN
MA NEXT
!
MA ? VA (>9)
MA VA
MA LO (<6)
MA RS
MA ? SX ()
MA SX
MA ? SY ()
MA SY
MA ? LA ()
```

```
MA LA
MA ? VU ()
MA VU
MA WENNDOLLAR
MA ERGEBNIS <3/NEWNEWNEW1
!
+3NEWNEW
:================================================================
:                              NOT 3NEWNEW
B QN3NEWN
B ? VA (>10)
B VA
B MTLINE LX O LYE
B LX
B SX (>5)
BE
B SY|<2|,SM ()
B ANZAHL(SY,<7)
B LA
BE
!
:================================================================
:                              3CENTER
+3CENT
MA QN3CENT
MA NEXT
!

MA Q3CENTUP
MA Q3CENTRIGHT
MA Q3CENTDOWN
MA ERGEBNIS <3/CENTERCENTER1
!
+3CENT
:================================================================
:                              NOT 3CENT
B QN3CENT
B LM
B ? LY|>8|
B LY|>8
B JUMP -9
B SM (>2)
B SX
B SM (>1)
B SX
B SY
B LY
BE
B LX (>1)
B LXE
B AS
BE
!
:----------------------------------------------------------------
:                              3 CENTER UP
B Q3CENTUP
B VA
B RS
B SM,SX ()
B LX
B LA
B JUMP -3
BE
B VA
B LO (<15)
B RS
B SX,SM,LX ()
BE
!
:----------------------------------------------------------------
```

```
:                              3 CENTERRIGHT
B Q3CENTRIGHT
B SY,SM ()
B VA
B LO (<6)
B RS
B SY,LY,SM,LYE ()
BE
B SY,SM ()
B VA,VAM
B RS
B SY,LY,SM,LYE ()
BE
!
:-------------------------------------------------------------
:                              3CENTDOWN
B Q3CENTDOWN
B SX,LX,SM (<21)
B ANZAHL(SX,>5)
B WENNDOLLAR
BE
B SX,LX,SM (<21)
B GOTO $3
B SX,LX (>3)
B WENNDOLLAR
BE
!
:=============================================================
:                              3END
+3END
MA QN3END
MA NEXT
!
MA ? VA,LVA -LS (>10)
MA VA,LVA
MA ? VU
MA VU
MA ERGEBNIS <3/ENDENDEND1
!
+3END
:=============================================================
:                              NOT 3END
B QN3END
B ? SX ()
B [SX,LX,LXE],SM (>3)
B [SY,LY],SM (>3)
B [SX,LX],SM ()
B NO
B ? LVA,VA ()
B LVA,VA
B LO,SIT (<6)
B RS
B SY,SM,LY ()
B &SX,SM,LX (>3)
B NO
BE
!
:=============================================================
:                              4PARALLEL
+4PARAL
MA QN4PARAL
MA NEXT
!
MA NOP(PARALLEL1)
MA VL(1;>5)
MA VL(2;<7)
MA VL(3;>7)
MA VL(4;<9)
MA VL(5;>8)
MA VL(6;<10)
MA VL(7;<9)
```

```
MA NO
MA JUMP -100
MA S ()
MA RA,LA
MA LO,DL (>5)
MA ? S (<10)
MA S (>4)
MA WENNDOLLAR
MA PARALLEL(1,6,3)
MA ERGEBNIS <4/PARALLEL1
!
+4PARAL
:===========================================================
B QN4PARAL                      :NOT 4PARALLEL
B SX,SM (>30)
B RA
B LO (<15)
B UR
B SX,SM (<6)
B WENNDOLLAR
BE
B PR(Y;>1-M;<4-X;<3-B-Y-$)
BE
!
:===========================================================
:                               4NEWNEW
+4NEWNEW
MA QN4NEWN
MA NEXT
!
MA NOP(4NEWNEW1)
MA FRONT SX,SM ()
MA FRONT AS
MA FRONT SX (>8)
MA FRONT ? SY (<4)
MA JUMP -100
MA ? RA,LA ()
MA RA,LA
MA ?($)
MA ERGEBNIS <4/NEWNEWNEW1
!
+4NEWNEW

:                               NOT 4NEWNEW
B QN4NEWN
B S ()
B RA
B LO (<5)
B MTLINE SM O VAX
BE
B SX,SM (>30)
B RA
B LO (<15)
B UR
B SX,SM (<6)
B WENNDOLLAR
BE
!
:===========================================================
:                               5NEWNEW
+5NEWNEW
MA QN5NEWN
MA NEXT
!
MA LX (>2)
MA GOTO $ +SY
MA ?($)
MA ERGEBNIS <5/NEWNEWNEW01
!
+5NEWNEW
:===========================================================
```

```
B QN5NEWN                       :NOT 5NEWNEW
B SX (<8)
B LVA
BE
B SX,SM (<20)
B VA
B LO (>3)
B SA
B ? UR (>5)
B UR
BE
!
:==========================================================
+6NEWNEW                        :6NEWNEW
MA QN6NEWN
MA NEXT 7NEWNEW
!
MA Q6TOP
MA FRONT SY,LY (>1)
MA FRONT VU
MA JUMP -100
MA BACK ? SY ()
MA BACK &SY,SM (>2)
MA BACK SX,SM,LX (>4)
MA BACK ANZAHL(SX,>2)
MA WENNDOLLAR
MA ERGEBNIS <6/NEWNEW1
!
+6NEWNEW
:==========================================================
B Q6TOP                         :6TOP
B SX,SM,LX (>6)
BE
B SY,LY,SM (<7)
B SX,SM,LX (>6)
BE
!
:==========================================================
:                               N6NEWNEW
B QN6NEWN
B PR(M-X;<4-Y;>1-M-Y-$)
BE
B SX (<3)
B RVA
BE
B ? LS ()
B LS
B SX (<3)
B VA
B MTLINE SX O MVU
BE
!
:==========================================================
+6GESCH                         :6GESCHLOSSEN
MA QN6GESCHL
MA NEXT
!
MA Q6TOP
MA FRONT ? LXE ()
MA FRONT LXE
MA NO
MA JUMP -100
MA ? S (<7)
MA S (>7)
MA ? LO ()
MA LO ()
MA GESCHLOSSEN(>3)
MA GOTO $
MA VU
MA ERGEBNIS <6/GESCHLOSSEN1
!
```

+6GESCH
:================================================================
:                                          NOT 6GESCHLOSSEN
B QN6GESCHL
B ? VAM (>10)
B BACK SM (>10
BE
B BACK LX¦>10¦
BE
!
:================================================================
:                                          7NEWNEW
+7NEWNEW
MA GOTO $5
MA S,L ()
MA WENNDOLLAR
MA NO
MA ROWN(>25)
MA NEXT
!
MA QN7NEWN
MA NEXT
!
MA FRONT ? AS,LXE,LXA ()
MA FRONT AS,LXE,LXA
MA JUMP -100
MA BACK ? ES,LYE ()
MA BACK ES,LYE
MA JUMP -100
MA GOTO $7
MA S (>7)
MA ERGEBNIS <7/NEWNEW001
!
+7NEWNEW
:================================================================
:                                          NOT 7NEWNEW
B QN7NEWN
B SX
B SM (>1)
B SX
B SM (>3)
B SY
BE
B ? RVA (>10)
B RVA
B MTLINE VU O SM
B SM,SX (>15)
B ANZAHL(SM,<5)
BE
!
:================================================================
B Q7TOP                                    :7NEWTOP
B VA¦>7¦
B LO ()
B RS
BE
B VA
B LO (<6)
B RS
B JUMP -1
B LOCHLAENGE($,>12)
B RS
BE
!
:----------------------------------------------------------------
B Q7CENTER1                                :7NEWCENTER1
B FRONT ? LXE,LXA ()
B FRONT LXE,LXA
B JUMP -100
B BACK ? LYE ()
B BACK LYE

```
BE
B FRONT ? AS ()
B FRONT AS
B JUMP -100
B BACK ? ES ()
B BACK ES
BE
!
:----------------------------------------------------------------------
B Q7CENTER2                                    :7NEWCENTER2
B FRONT ? LXE,LXA -LS ()
B FRONT LXE,LXA
BE
B BACK ? ES -LS ()
B BACK ES
BE
!
:----------------------------------------------------------------------
B Q7BOTTOM                                     :7NEWBOTTOM
B JUMP -100
B GOTO $6
B SX,SM (>6)
B WENNDOLLAR
BE
B JUMP -100
B GOTO $6
B SX,SM,SY (>6)
B ANZAHL(SY,<2)
B WENNDOLLAR
BE
!
:======================================================================
:                                               8NEWNEW
+8NEWNEW
MA QN8NEWN
MA NEXT 9NEWNEW
!
MA VA
MA LO (<10)
MA RS
MA S (<6)
MA LA
MA LO ()
MA VM
MA ? VU ()
MA VU
MA JUMP -6
MA LO ()
MA VU
MA WENNDOLLAR
MA ERGEBNIS <8/NEWNEW1
!
+8NEWNEW
:======================================================================
:                                               NOT 8NEWNEW
B QN8NEWN
B FRONT VA
B FRONT SX,SM ()
B FRONT SY,SM ()
B FRONT VU
B JUMP -100
B BACK VA
B BACK SY,SM ()
B BACK SX,SM ()
B BACK LX
B BACK VU
BE
B VA
B LO (<4)
B VM (<4)
```

```
B LO ()
B VU
B ROWN(>29)
BE
!
:================================================================
:                        0GESCHLOSSEN
+0GESCHL
MA QN0GESCH
MA NEXT
!
MA ? VM (>5)
MA VM
MA NEXT
!
MA ? LO (<6)
MA LO ()
MA GESCHLOSSEN(>4)
MA JUMP -100
MA BACK VA
MA BACK SY (>1)
MA ?($)
MA ERGEBNIS <0/GESCHLOSSEN1
!
+0GESCHL
:================================================================
B QN0GESCH
B LOCH(2,2,<7,0,2)
BE
B FRONT VA|<5|
B FRONT SX (>4)
BE
!
:================================================================
:                           9NEWNEW
+9NEWNEW
MA QN9GESCH
MA NEXT
!
MA ? LO (<6)
MA LO ()
MA GESCHLOSSEN(>4)
MA JUMP -100
MA Q9UNTEN
MA JUMP -100
MA BACK VA
MA BACK SY (>1)
MA ?($)
MA ERGEBNIS <9/GESCHLOSSEN1
!
+9NEWNEW
:================================================================
B QN9GESCH            :NOT 9GESCHLOSSEN
B VA
B ? DL (<4)
B DL (>12)
BE
B WENN VA SA
BE
!
:================================================================
B Q9UNTEN          :BOTTOM 9GESCHLOSSEN
B GOTO $9
B S,L (>9)
BE
B ? LA (>15)
B LA
B LO ()
B VU
BE
!
```

```
:                       NOT 9NEWNEW
B QN9NEWN
B ? VA ()
B VA
B JUMP -100
B BACK VA
B BACK ? SY (<9)
B B SY
B NO
B JUMP -100
B LOCH(2,2,>6,4,1)
BE
B VA
B LO (>5)
B RS|<3|
B SX,SM (>7)
B SY (>2)
B WENNDOLLAR
BE
!
:================================================
+RAUS1
MA ? EE ()
MA EE ()
MA NEXT RAUS
!
+RAUS
:================================================
B Q9NEWTOP           :NEUN NEW TOP
B VA
B LO (>6)
B NINE ()
B VU
BE
B VA
B LO (<7)
B LS
B SX,SM (<7)
B RA
B LO (>3)
B ? UR,VU (<4)
B VU,UR
BE
!
:================================================
B Q9NEWBOT           :NEUN NEW BOTTOM
B S (>6)
B WENNDOLLAR
BE
B S ()
B LA
B LO ()
B VU
B WENNDOLLAR
BE
!
:================================================
B Q9NEWHOLE                  :NEUN NEW HOLE
B PL(1;<2)   :1
B PL(2;<4)
B PL(3;<6)
BE
B VA
B LO (>6)
B SA
B DL (>1)
B NO
B JUMP -100
B PL(1;<5)   :2
B PL(2;<10)
```

```
B PL(3;<11)
BE
!
:===============================================================
:                                     NOT NEUN NEW
B QN9NEW
B SD(>50,4)
BE
!
:===============================================================
B Q2NEWTOP                    :ZNT   :ZWEI NEW TOP
B VA    :2
B LO (<12)
B RS
BE
B 2TOP (>2)
B &SY,SM (>2)
BE
!
::==============================================================
B Q2NEWBOT1                   :ZNB   :ZWEI NEW BOTTOM
B XXX
BE
!
:................................................................
B Q2NEWBOT2
B LVA
B ZW ()
B DL (>2)
B UR
B SY ()
B WENNDOLLAR
BE
B LVA
B ZW ()
B DL ()
B LS
BE
!
:---------------------------------------------------------------
B Q2BACKTOP                   :2BACK TOP
B VA
B ? RS (<12)
B RS
B BACK SY,SM ()
BE
B VA
B ? RS (<12)
B RS
BE
!
:---------------------------------------------------------------
B Q2BACKCENT                  :2BACK CENTER
B BACK SX,SM,LX (>6)   :1
B BACK ANZAHL(SX,>2)
BE
B BACK &LX,SX,SM (>3)   :2
B BACK ANZAHL(SX,>1)
BE
B BACK SX,LX (>4)    :3
BE
!
:---------------------------------------------------------------
B Q2BACKBOT                   :2BACK BOTTOM
B BACK SY  :1
B BACK AS,LYA
B BACKLEN(>4)
B BACK SX,SM,LX (<15)
B BACK VU
B WENNDOLLAR
```

```
BE
B BACK AS,LYA   :2
B BACKLEN(>4)
B BACK SX,SM,LX (<15)
B BACK VU
B WENNDOLLAR
BE
!
:================================================
:                               NOT ZWEI NEW
B QN2NEW
B VA
B LO ()
B RS
B SY
B SM (>4)
B LA
BE
B ? VM (>9)
B VM
B S (>3)
B VM
BE
!
:================================================
B Q3NEWTOP         :DREI NEW TOP
B VA
B LO (<12)
B RS
BE
B LY
B LM¦>4¦
B SM
BE
!
:================================================
B Q3NEWCENT                    :DREI NEW CENTER
B &SY,SM (>2)
B &SX,SM,LX (>4)
B XVA,MVA
B LOG (<8)
B RS
B SM,SY (>1)
BE
!
:================================================
B Q3NEWBOT         :DREI NEW BOTTOM
B XXX
BE
!
:================================================
B Q6NEWTOP         :SECHS NEW TOP
B ? SX,SM (<6)
B SX,SM (>8)
BE
B LX
B SX,SM (>6)
BE
!
:================================================
B Q6NEWCENT        :SECHS NEW CENTER
B SIX
B DL (>6)
B VU
B WENNDOLLAR
BE
B SIX
B DL (>6)
B VU
B S (<15)
B WENNDOLLAR
```

```
BE
!
:=========================================================
B QN3NEW            :NICHT DREI NEW
B GOTO $5
B SM,SX  (>5)
B ANZAHL(SX,<2)
BE
B BACK ? LYA (>10)
B BACK LYA
B BACK SM
B BACK LX
B BACK SY
BE
!
:=========================================================
B QVIERLOCH         : VIERLOCH      :VIER NEW
B VIERLOCH(>10,<13;>6)
BE
B VIERLOCH(>10,<14;>9)
BE
B VIERLOCH(>19,<24;>10)
BE
!
:=========================================================
B QN5NEW            :NOT FUENF NEW
B GOTO $4
B SY,LY  (>4)
BE
B BACK VA
B BACK S,L,LXE (>10)
BE
!
:=========================================================
B QN2BACK                           :NOT 2BACK
B VA
B LO (>15)
B VM
BE
B ? FRONT ES (<15)
B FRONT ES
B WENN EE
BE
!
:**********************************************************
$
```

A typical example of a search of the recognition file is illustrated in FIG. 12. The recognition table and if called for Tables A and B are compared line by line with the MA block. The MA block contains instructions dictating how the search is to be performed. The MA block may simply direct the search through a few lines of the recognition table representing the pixel matrix. For example:

| | |
|---|---|
| MA LX | The first line in the recognition table must be LX. |
| MA SM, SX | The second line must be SM or SX (a comma indicates an alternative or an OR operation). |
| MA SY | The third line must be SY. |
| MA ergebnis <5 | If all the other lines matched a numeral five is found. |

There are other symbols which constitute instructions for the search. They include: ()—no limitation on the number of repetitions or times that the code or codes in the MA line appear in the table; (>n)—at least n lines with the same code must follow in the recognition table; (<n)—no more than two lines having the code or codes in the MA line are allowed to follow successively in the recognition table; and a $ sign means the last line of the recognition table.

There are also various function lines. For example the ? mark is a function which searches for a specified pattern from a particular line in the recognition table. For example the codes which must be found are indicated. For example: MA? SX, SM−LY+SY () means search from the line in the recognition table obtained from the skeleton pixel matrix which corresponds to this MA line for the pattern SX or SM, but a match will not be found if LY is encountered or if SY is not encountered. Another function is GO TO. The GO TO function allows skipping of lines or areas of the recognition table not of interest. For example B GO TO $ may be found in a B block and is an instruction to jump to the end of that block.

There may also be a jump function which moves the search up or down the recognition table. It can even be used as a double check.

The winkle or angle function instructs a search of the bit map in working area one and invokes a program to calculate the angle between two straight lines on the front side of the bit map. The limits of the angle are specified in the parenthesis after the word winkle. For example (68, 120) means that the angle must be greater than 68 degrees and less that 120 degrees. The LOCH function is used to instruct a search of the pixel skeleton and is used to distinguish numeral four from a nine. Five variables are checked namely (a) how many lines from a line where a hole starts to the first line of the skeleton; (b) how many lines from the last line of the skeleton to the end of the hole; (c) the length of the hole in the line where the hole starts; (d) the number of lines having the same hole length so as to pick up parallel holes; and (e) the number of lines where the hole length decreases.

The NOT function merely inverts the logic of the search. For example NOT SX SM is satisfied if the line does not contain an SX and also following an SM. If it contains any other code the line is satisfied.

The LOCHLAENGE function measures the length of a hole in a line of the pixel skeleton. For example LOCHLAENGE ($, 3, 5) means that the length of the third line in the bit map must be greater than five columns in the matrix.

The WENN function checks the entire recognition file corresponding to the pixel matrix. An inverted carrot or the roof symbol means the top of the recognition file. An N followed by a carrot means that the line is not at the top of the M key table, and as noted above a $ sign means that the code is the last line of the table. An N$ means the code is not in the last line of the table. Thus for example MA WENN LY SY SM N$ looks for a pattern LY SY SM and the SM must not be the last line of the table.

The WENNICH function reverses the logic of the WENN function.

The AWINKLE function scans the bit map for an interior angle so as to distinguish a one from a seven.

The GESCHLOSSEN function scans the pixel skeleton map in work area two for holes of certain length.

The ANZAHL function is operative when a previous MA line calls for a repetition of the M key codes; i.e. where the number of codes are present in a certain number of lines. This function scans the table to find the total number of M key codes which are found at least a certain number of times in the recognition table. Another function is PRUEFEU 1 and is used for distinguishing numerals patterns for ones and twos. The function goes to the bottom line of the pixel skeleton to find if the percentage of the line length to the left is in a certain range of the total line length. For example PRUEFE 1U (38, 100) means that the line length to the left is from 38 to 100 percent of the total line length thereby indicating that the pattern represents a two rather than a one.

The LOZ function interrogates the pixel skeleton for a closed hole. The LOO function interrogates the pixel skeleton for an open hole. The ANZAHLH function checks the pixel skeleton for the number of shifts to the right in a certain number of lines in the rear view of the skeleton and is used to distinguishes threes from fives. The NAZAHLV function again interrogates the pixel skeleton and is similar to the ANZLH function but looks at the front view of the skeleton.

The NEUNLOCH or nine hole function interrogates the bit map for the size of the opening of a hole thereby distinguishing nines from fives. The ROWN function interrogates the pixel skeleton work area (2) for the number of rows containing pixels and is used to limit the search for MA lines, thereby setting borders, which if exceeded, exclude that block as corresponding to a valid character. For example, B ROWN (<35) is true if the number of lines in the bit map in the work area is less than 35. The ROWNP function as opposed to the ROWN function checks the number of rows in the bit map work area (1), while the ROWN checks the number of rows in the skeleton work area (2).

The LINE function checks for special connection codes which were not reduced to a single MT code in the remote possibility that a connection code combination was not reduced to the MT code. The MT line function restricts the line function search to a particular line in the recognition table. The PARALLEL function looks for an open hole in the bit map. For example parallel (3, 7, 2) searches the bit map for a parallel section from the third line with a hole over seven consecutive lines with a tolerance of two pixel spaces (2 rows).

Returning to FIG. 12, it will be observed that the program can proceed to a B block when called for in an MA line. The program jumps to the file containing the B block. The MA block may be instructed to jump to the next MA block for this character when the command NEXT appears instead of the RESULT command, ergebnis, at the end of the MA block. When a NEXT command appears the table is searched until a + sign is reached. The + sign indicates the blocks for the NEXT search and are usually blocks representing the same character or another character at a higher recognition difficulty level. After all MA blocks have been searched following instructions therein, either a match is detected and the character is stored in terms of the ASCII code therefore in the data file or a ACSII character for a ? mark is stored indicating an unrecognizable character has been found at some stage of the search through the recognition file.

As shown in FIG. 1 by the decisions 40 & 41, the program loops and repeats the recognition program to repetitively separate individual characters and recognize them until all characters on the page are recognized or found unrecognizable.

The microfiche appendix contains source codes for programs which carry out the routines illustrated in the foregoing flowcharts. These source codes are presented solely for purposes of example and it will be appreciated that the routines can be expressed in other source codes. The code is presented below with a copyright notice indicating that all rights therein are reserved. A glossary of German words and their translation follows the source codes.

From the foregoing description it will be apparent that there has been provided an improved character recognition system especially adapted for recognizing handwritten characters which may be written in different shapes and formats. Variations and modifications and other applications of the herein described system, within the scope of the invention, will undoubtedly suggest themselves to those skilled in the art. Accordingly the foregoing description should be taken as illustrative and not in a limiting sense.

I claim:

1. The method of recognizing handwritten characters in a set thereof which comprises the steps of generating in a computer memory a digital signal representation of a map arranged in rows and columns representing pixels constituting individual ones of said characters, translating said map into a plurality of recognition tables each containing a string of digital signals representing the relative positions of the pixels in at least a plurality of said rows and characterizing the individual character in its entirety in a different way, including connections between said pixels in said rows and columns and front and rear views of said pixels, and searching said table selectively through successions of digital signals contained in successive blocks of such successions of digital signals, which blocks correspond to characters in said set, and which blocks correspond to a recognition file and which successions in each of said blocks contain instructions specifying which of said plurality of tables is to be searched to find said succession therein, until a match with the successions of digital signals in one of said block is found and the character is recognized, the character being unrecognizable in the absence of a match with all of the blocks in said file.

2. The method of claim 1 wherein said file contains blocks of successions characterizing a character excluded from said set, and said searching step includes the step of indicating the character as being unrecognizable when said selected tables match any of said blocks which characterize an excluded character.

3. The method of claim 1 wherein said blocks in said file are arranged in groups, each group including blocks corresponding to the same characters in said set, but with a different level of recognition difficulty, and said searching step is carried out by searching said groups successively in order of recognition difficulty of the characters to which correspond, with the group of lowest recognition difficulty being first.

4. The method of claim 1 wherein said translating step is carried out to provide at least one of said tables defining the shape of said map within a matrix defined by said rows and columns and others of said tables defining the shape of a different border of said matrix.

5. The method of claim 4 wherein said translating step is carried out by encoding each row of pixels of said map which define the general shape of said map into connection codes which represent the relative position of the pixels therein with respect to pixels in adjacent rows to provide another of said tables.

6. The method according to claim 5 further comprising the step of thinning the map of said pixels of said character to provide in said computer memory another map of a skeleton of said character which contains data representing the ones of said pixels along a center line through said character, and carrying out said encoding step on said skeleton to provide still another of said tables.

7. The method according to claim 6 further comprising the step of processing said map of said pixels before carrying out said thinning step to bring pixels along rows which define borders of said map into alignment.

8. The method according to claim 5 further comprising the step of reducing said connection codes for each of said rows into single codes for each row of said map representing a plurality of connection codes for each row to define with said single codes the string of data signals in the one of said recognition tables representing said matrix.

9. The method of claim 8 wherein said reducing step is carried out by searching a table containing a plurality of translations correlating different connection codes with at least one of said single codes for a match with said connection codes to define said single code string.

10. The method of claim 9 wherein said table of translations contains a plurality of blocks correlating connection codes for a plurality of rows of said matrix with a plurality of single codes, each for a different one of said rows, and searching said translation blocks successively for a match to provide at least a plurality of single codes of said single code string.

11. The method of claim 10 wherein said table of translations includes lines correlating a plurality of connection codes for a single row of said matrix with a code of said single code string, and said searching step is carried out to search said translation blocks and said lines successively to provide said single code string.

12. The method of claim 4 wherein said translating step is carried out to provide a first and a second of said others of said tables by encoding the relative location of the pixels disposed along the edges said map viewed from opposite aspects into direction codes corresponding to different relative displacements of said pixels at the ends of adjacent successive lines of said matrix along one of said rows and columns.

13. The method of claim 12 wherein said aspects are the front and rear side views which face the ends of each row of said matrix on the front and rear sides thereof, and said encoding step is carried out by selecting said direction codes in accordance with the distance in number of columns between in which pixels are located which define the ends of successive, adjacent ones of said rows of the matrix.

14. The method of claim 4 further comprising the step of thinning the map of said pixels of said character to provide in said computer memory another map constituting a second matrix in rows and columns of a skeleton of said character which contains data representing the ones of said pixels along the center line through said character, and wherein said translating step is carried out to provide a third and a fourth of said others of said tables by encoding the relative locations of said pixels in said skeleton viewed from said opposite aspects thereof into selected ones of said direction codes corresponding to the different relative displacement of said pixels in successive lines along one of said rows and columns of said second matrix.

15. The method of claim 14 wherein said opposite aspects are the front and rear side views of said second matrix facing the ends of said second matrix on the front and rear sides thereof, and said encoding step is carried out by selecting said direction codes in accordance with the distance in number of columns in which pixels are located which define the ends of successive, adjacent ones of said rows of said second matrix.

16. The method according to claim 4 wherein said translating step is carried out to provide a fifth and a sixth of said tables in accordance with the distance in number of columns in each row of said matrix which defines the width of a hole in said map open towards the top of said matrix and the width of a hole in said map open towards the bottom of said matrix.

17. The method of claim 1 wherein said digital signal strings in said recognition tables are selected from different codes which describe the character in each of said different ways, said successions of digital signals in each of said blocks being codes selected from said different codes which correspond to the same character in said set handwritten in different patterns and which exclude different characters in said set, and said searching step is carried out by correlating said blocks with said codes in said tables.

18. The method of claim 17 wherein said blocks also include codes representing arrangements of pixels in said map, and said searching step includes the step of searching said map for such arrangements.

19. The method of recognizing handwritten characters in a set thereof which comprises the steps of generating in computer memory a digital signal representation of a map arranged in rows and columns representing pixels constituting each of said characters individually, translating said map representation into at least one table containing a string of digital signals coded in accordance with the relative location of said pixels, searching a plurality of groups of files each having different signal strings which correspond to the characters in said set in forms relatively more difficult to recognize, the groups of files being searched in hierarchical order in accordance with the recognition difficulty of the characters which they represent, for the presence or absence of a match with a digital string of said table until each character is found and recognized, and indicating unrecognizability of the character when a match is not found after searching all of said groups, and wherein said files contain blocks of said digital signal strings which correspond to and characterize a character as being excluded from said set, and said searching step includes the step of indicating the character as being unrecognizable when at least one table matches any of said blocks which characterize an excluded character.

20. The method of recognizing handwritten characters in a set thereof which comprises the steps of generating in computer memory a digital signal representation of a map arranged in rows and columns representing pixels constituting each of said characters individually, translating said map representation into at least one table containing a string of digital signals coded in accordance with the relative location of said pixels, searching a plurality of groups of files each having different signal strings which correspond to the characters in said set in forms relatively more difficult to recognize, the groups of files being searched in hierarchical order in accordance with the recognition difficulty of the characters which they represent, for the presence or absence of a match with a digital string of said table until each character is found and recognized, and indicating unrecognizability of the character when a match is not found after searching all of said groups, and wherein said files contain blocks of digital signal strings, said translating step provides a plurality of tables which represent the individual characters in their entirety in different way, including connection between said pixels in said rows and columns and front and rear views of said pixels and said digital strings in each of said blocks contain instructions specifying the one of said tables to be searched to find said digital string therein.

21. The method of recognizing handwritten characters in a set thereof which comprises the steps of generating in computer memory a digital signal representation of a map arranged in rows and columns representing pixels constituting each of said characters individually, translating said map representation into at least one table containing a string of digital signals coded in accordance with the relative location of said pixels, searching a plurality of groups files each having different signal strings which correspond to the characters in said set in forms relatively more difficult to recognize, the groups of files being searched in hierarchical order in accordance with the recognition difficulty of the characters which they represent, for the presence or absence of a match with a digital string of said table until each character is found and recognized, and indicating unrecognizability of the character when a match is not found after searching all of said groups, and wherein said translating step is carried out to provide a plurality of tables which include said one table, said one table defining the shape of said map within a matrix defined by said rows and columns and others of said plurality of tables defining the shape of a different border of said matrix.

22. The method of claim 2 wherein said translating step is carried out by encoding each row of pixels of said map which define the general shape of said map into connection codes which represent the relative position of the pixels therein with respect to pixels in adjacent rows.

23. The method according to claim 22 further comprising the step of thinning the map of said pixels of said character to provide in said computer memory another map of a skeleton of said character which contains data representing the ones of said pixels along a center line through said character, and carrying out said encoding step on said skeleton.

24. The method according to claim 23 further comprising the step of processing said map of said pixels before carrying out said thinning step to bring pixels along rows which define borders of said map into alignment.

25. The method according to claim 22 further comprising the step of reducing said connection codes for each of said rows into single codes for each row of said map representing a plurality of connection codes for each row to define with said single codes the string of data signals in the one of said recognition tables representing said matrix.

26. The method of claim 25 wherein said reducing step is carried out by searching a table containing a plurality of translations correlating different connection codes with at least one of said single codes for a match with said connection codes to define said single code string.

27. The method of claim 26 wherein said table of translations contains a plurality of blocks correlating connection codes for a plurality of rows of said matrix with a plurality of single codes, each for a different one of said rows, and searching said translation blocks successively for a match to provide at least a plurality of single codes for said single code string.

28. The method of claim 27 wherein said table of translations includes lines correlating a plurality of connection codes for a single row of said matrix with a code of said single code string, and said searching step is carried out to search said translation blocks and said lines successively to provide said single code string.

29. The method of claim 21 wherein said translating step is carried out to provide a first and a second of said others of said tables by encoding the relative location of the pixels disposed along the edges said map viewed from opposite aspects into direction codes corresponding to different relative displacements of said pixels at the ends of adjacent successive lines of said matrix along one of said rows and columns.

30. The method of claim 29 wherein said aspects are the front and rear side views which face the ends of each row of said matrix on the front and rear sides thereof, and said encoding step is carried out by selecting said direction codes in accordance with the distance in number of columns between in which pixels are located which define the ends of successive, adjacent ones of said rows of the matrix.

31. The method of claim 21 further comprising the step of thinning the map of said pixels of said character to provide in said computer memory another map constituting a second matrix in rows and columns of a skeleton of said character which contains data representing the ones of said pixels along the center line through said character, and wherein said translating step is carried out to provide a third and a fourth of said others of said tables by encoding the relative locations of said pixels in said skeleton viewed from said opposite aspects thereof into selected ones of said direction codes corresponding to the different relative displacement of said pixels in successive lines along one of said rows and columns of said second matrix.

32. The method of claim 31 wherein said opposite aspects are the front and rear side views of said second matrix facing the ends of said second matrix on the front and rear sides thereof, and said encoding step is carried out by selecting said direction codes in accordance with the distance in number of columns in which pixels are located which define the ends of successive, adjacent ones of said rows of said second matrix.

33. The method according to claim 21 wherein said translating step is carried out to provide a fifth and a sixth of said tables in accordance with the distance in number of columns in each row of said matrix which defines the width of a hole in said map open towards the top of said matrix and the width of a hole in said map open towards the bottom of said matrix.

34. The method of claim 21 wherein said digital signal strings in said tables are selected from different codes which describe the character in each of said different ways, said files contain said strings in blocks of successions of digital signals, said successions of digital signals in each of said blocks being codes selected from said different codes which correspond to the same character in said set handwritten in different patterns and which exclude different characters in said set, and said searching step is carried out by correlating said blocks with said codes in said tables.

35. The method of claim 34 wherein said blocks also include codes representing arrangements of pixels in said map, and said searching step includes the step of searching said map for such arrangements.

36. A system for recognizing handwritten characters in a set thereof which comprises a computer having a memory, means for generating in computer memory a digital signal representation of a map arranged in rows and columns representing pixels constituting individual ones of said characters, means for translating said map into a plurality of recognition tables each containing a string of digital signals representing the relative positions of the pixels in at least a plurality of said rows and characterizing the individual character in its entirety in a different way, including connection between said pixels in said rows and columns and front and rear views of said pixels and means for searching said table selectively through successions of digital signals contained in successive blocks of such successions of digital signals which correspond to characters in said set, said successions in each of said blocks containing instructions specifying which one of said plurality of tables is to be searched to find said succession therein thereby enabling said tables to be searched selectively, which blocks constitute a recognition file, until a match with a succession of digital signals in one of said blocks is found and the character is recognized, the character being unrecognizable in the absence of a match with all of the blocks in said file.

37. The system of claim 36 wherein said file contains blocks of successions characterizing a character excluded from said set, and said searching means includes means for indicating the character as being unrecognizable when said selected tables match any of said blocks which characterize an excluded character.

38. The system of claim 36 wherein said blocks in said file are arranged in groups, each group including blocks corresponding to the same characters in said set, but with a different level of recognition difficulty, and said searching means includes means for searching said groups successively in order of recognition difficulty of the characters to which correspond, with the group of lowest recognition difficulty being first.

39. The system of claim 36 wherein said translating means includes means for providing at least one of said tables defining the shape of said map within a matrix defined by said rows and columns with others of said tables defining the shape of a different border of said matrix.

40. The system of claim 39 wherein said translating means includes means for encoding each row of pixels of said map which define the general shape of said map into connection codes which represent the relative position of the pixels therein with respect to pixels in adjacent rows to provide another of said tables.

41. The system according to claim 40 further comprising means for thinning the map of said pixels of said character to provide in said computer memory another map of a skeleton of said character which contains data representing the ones of said pixels along a center line through said character, and said encoding means is operative on said skeleton to provide still another of said tables.

42. The system according to claim 41 further comprising means for processing said map of said pixels before operating said thinning means to bring pixels along rows which define borders of said map into alignment.

43. The system according to claim 40 further comprising means for reducing said connection codes for each of said rows into single codes for each row of said map representing a plurality of connection codes for each row to define with said single codes the string of data signals in the one of said recognition tables representing said matrix.

44. The system of claim 43 wherein said reducing means includes means for searching a table containing a plurality of translations correlating different connection codes with at least one of said single codes for a match with said connection codes to define said single code string.

45. The system of claim 44 wherein said table of translations contains a plurality of blocks correlating connection codes for a plurality of rows of said matrix with a plurality of single codes, each for a different one of said rows, and means for searching said translation blocks successively for a match to provide at least a plurality of single codes of said single code string.

46. The system of claim 45 wherein said table of translations includes lines correlating a plurality of connection codes for a single row of said matrix with a code of said single code string, and said searching means includes means for searching said translation blocks and said lines successively to provide said single code string.

47. The system of claim 39 wherein said translating means includes means for providing a first and a second of said others of said tables by encoding the relative location of the pixels disposed along the edges said map viewed from opposite aspects into selected direction codes corresponding to different relative displacements of said pixels at the ends of adjacent successive lines of said matrix along one of said rows and columns.

48. The system of claim 47 wherein said aspects are the front and rear side views which face the ends of each row of said matrix on the front and rear sides thereof, and said encoding means includes means for selecting said direction codes in accordance with the distance in number of columns between in which pixels are located which define the ends of successive, adjacent ones of said rows of the matrix.

49. The system of claim 39 further comprising means for thinning the map of said pixels of said character to provide in said computer memory another map constituting a second matrix in rows and columns of a skeleton of said character which contains data representing the ones of said pixels along the center line through said character, and wherein said translating means includes means for providing a third and a fourth of said others of said tables by encoding the relative locations of said pixels in said skeleton viewed from said opposite aspects thereof into selected ones of said direction codes corresponding to the different relative displacement of said pixels in successive lines along one of said rows and columns of said second matrix.

50. The system of claim 49 wherein said opposite aspects are the front and rear side views of said second matrix facing the ends of said second matrix on the front and rear sides thereof, and said encoding means includes means for selecting said direction codes in accordance with the distance in number of columns in which pixels are located which define the ends of successive, adjacent ones of said rows of said second matrix.

51. The system according to claim 49 wherein said translating means includes means for providing a fifth and a sixth of said tables in accordance with the distance in number of columns in each row of said matrix which defines the width of a hole in said map open towards the top of said matrix and the width of a hole in said map open towards the bottom of said matrix.

52. The system of claim 36 wherein said digital signal strings in said recognition or tables are selected from different codes which describe the character in each of said different ways, said successions of digital signals in each of said blocks being codes selected from said different codes which correspond to the same character in said set handwritten in different patterns and which exclude different characters in said set, and said searching means includes for correlating said blocks with said codes in said table or tables.

53. The system of claim 52 wherein said blocks also include codes representing arrangements of pixels in said map, and said searching means includes means for searching said map for such arrangements.

* * * * *